(12) United States Patent
Thurm

(10) Patent No.: US 7,066,448 B2
(45) Date of Patent: Jun. 27, 2006

(54) PORTABLE MOTORCYCLE LIFT

(76) Inventor: Kenneth R. Thurm, 2348 N. Rockridge Cir., Orange, CA (US) 92867

( * ) Notice: Subject to any disclaimer, the term of this patent is extended or adjusted under 35 U.S.C. 154(b) by 75 days.

(21) Appl. No.: 10/674,221

(22) Filed: Sep. 29, 2003

(65) Prior Publication Data

US 2005/0077505 A1  Apr. 14, 2005

(51) Int. Cl.
*B60P 1/48* (2006.01)
(52) U.S. Cl. .................. 254/9 C; 254/124
(58) Field of Classification Search ............ 254/124, 254/122, 10 R, 10 C, 8 R, 8 C, 9 R, 9 C, 254/133, 134, 90; 187/18
See application file for complete search history.

(56) References Cited

U.S. PATENT DOCUMENTS

| | | | |
|---|---|---|---|
| 4,460,158 A * | 7/1984 | Chiesa et al. ............ 254/124 |
| 4,494,764 A | 1/1985 | Kelley | |
| 5,271,603 A | 12/1993 | White | |
| 5,358,265 A | 10/1994 | Yaple | |
| D378,155 S | 2/1997 | Bartow et al. | |
| 5,769,396 A | 6/1998 | Tischendorf | |
| 5,839,875 A | 11/1998 | Miller et al. | |
| 5,899,655 A | 5/1999 | Miller et al. | |
| 5,979,878 A | 11/1999 | Blankenship | |
| 6,092,787 A | 7/2000 | Nayman | |
| 6,338,470 B1 | 1/2002 | Steely et al. | |
| 6,345,693 B1 | 2/2002 | Yeo et al. | |
| 6,371,449 B1 | 4/2002 | Chamberlain | |
| 6,464,207 B1 | 10/2002 | Creel et al. | |
| 6,575,310 B1 | 6/2003 | Chamoun | |
| 6,579,055 B1 | 6/2003 | Williams | |
| 6,598,855 B1 | 7/2003 | Petrone | |
| 6,648,300 B1 | 11/2003 | Chamoun | |

OTHER PUBLICATIONS www.MotorcycleJacks.com; Aug. 4, 2003; Air Powered Hydraulic Motorcycle/ATV Work Station.
www.Lift-Buddy.com; Jun. 12, 2003; Hydraulic Foot Pump Operated Lift.
www.amazingproducts.com; Aug. 4, 2003; Amazing UpLife Motorcycle Lift.
www.masterhoist.com; Jun. 12, 2003; "Master Hoist".
www.masterhoist.com; Aug. 4, 2003; "Master Hoist".
www.MotorcycleJacks.com; Aug. 4, 2003; The MAL-2 'Show Edition' Motorcycle/ATV Jack.

* cited by examiner

*Primary Examiner*—Robert C. Watson
(74) *Attorney, Agent, or Firm*—Stetina Brunda Garred & Brucker

(57) ABSTRACT

A portable tubular motorcycle lift is provided which utilizes a scissor frame configuration. The scissor frame includes an inner lifting structure and an outer lifting structure rotatably hinged about a common center fulcrum. An upper cradle support is attached to the inner and outer lifting structures. The motorcycle lift has a deployed configuration and a folded, stowable non-deployed configuration which allows the lift to be transported similar to a dolly. To provide the required forces to lift a large motorcycle, an articulated lifting system which includes a jacking device, lifting arm, and linkage arm, is integrated within the inner and outer lifting structures. Other features of the motorcycle lift include a bracing member, rear support section, removable ramp, well chock, remote jacking system, remote pressure release feature, and removable and positionable auxiliary jacking device positioned with the upper cradle support.

21 Claims, 13 Drawing Sheets

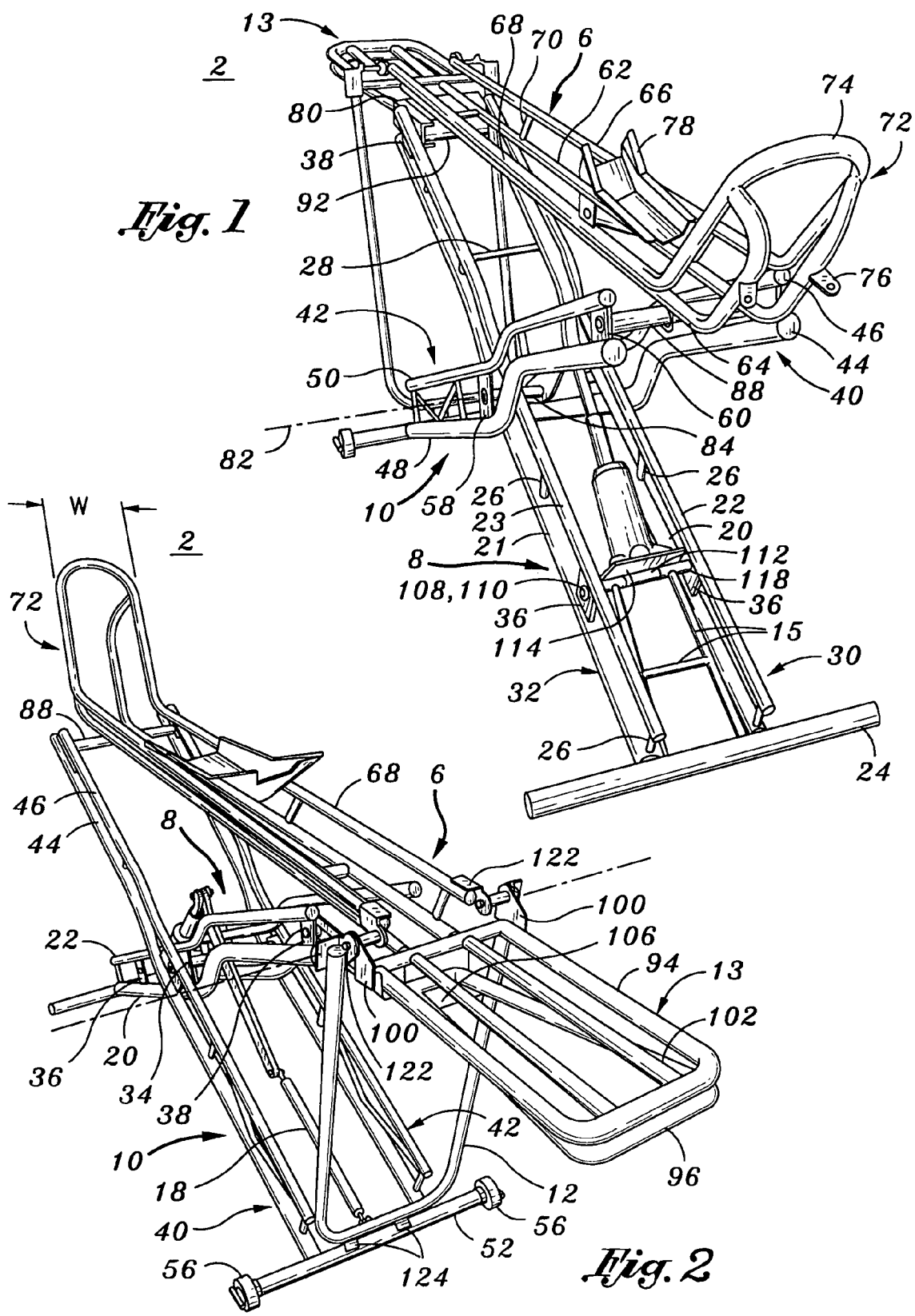

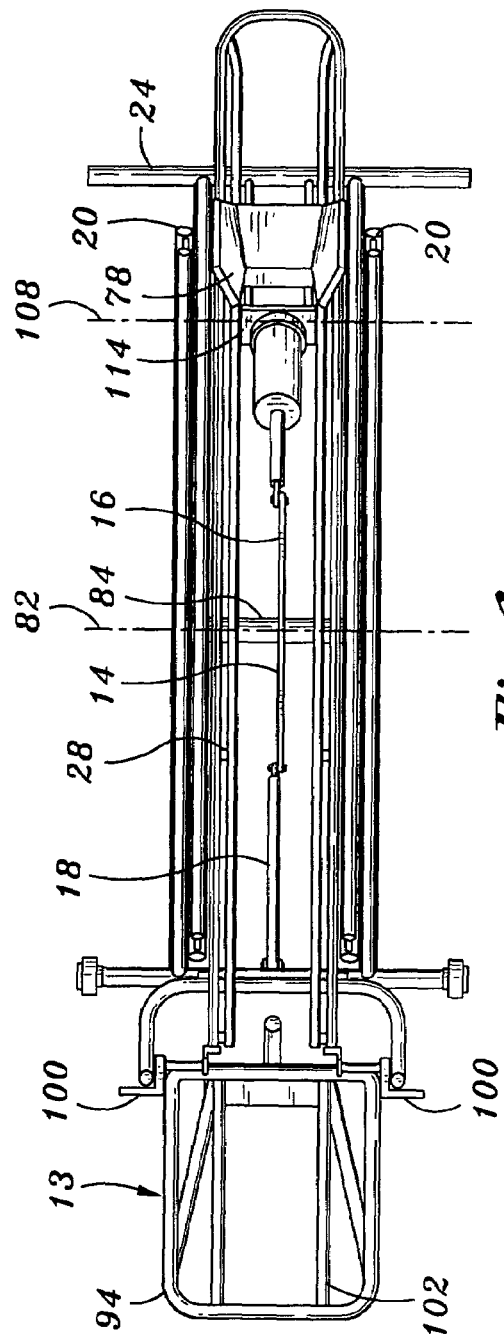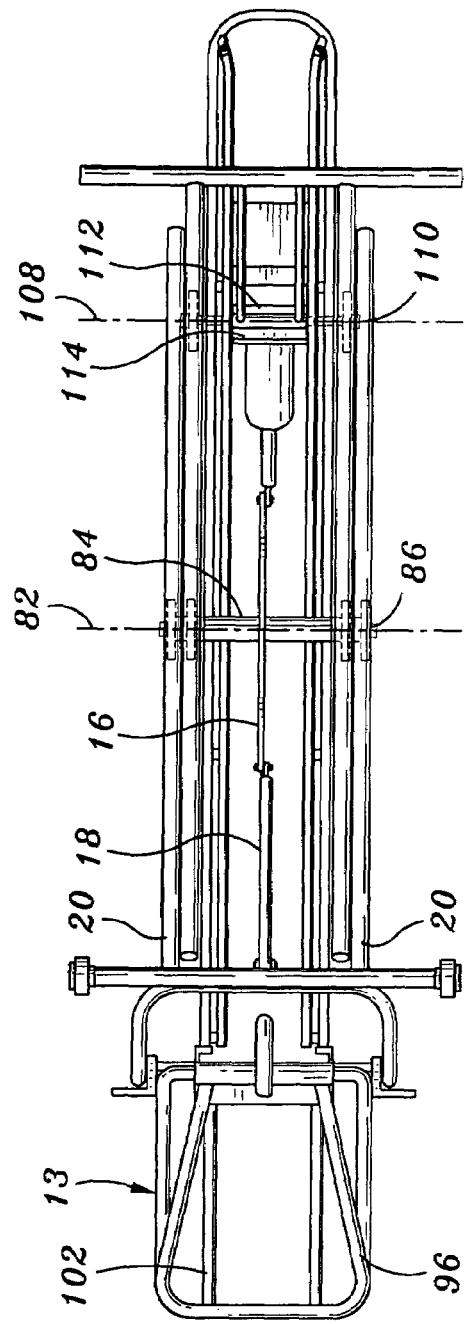

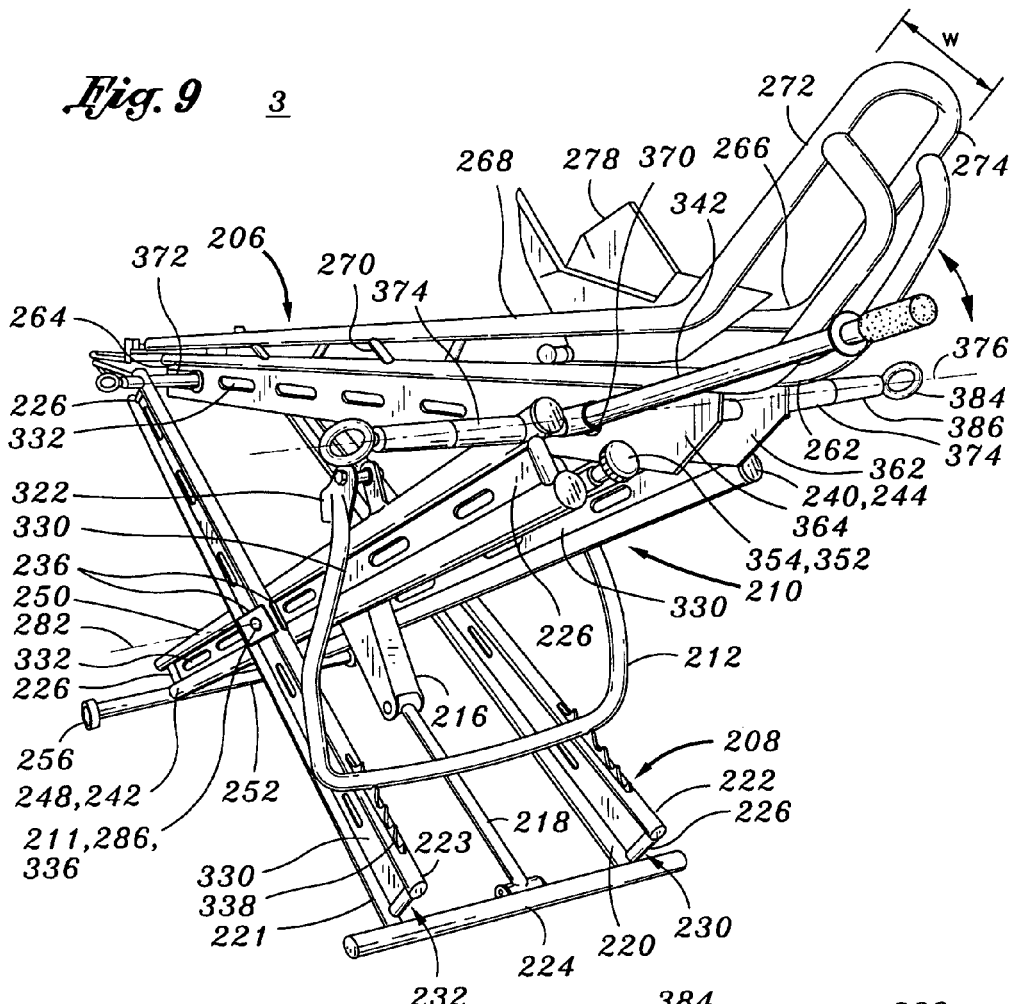
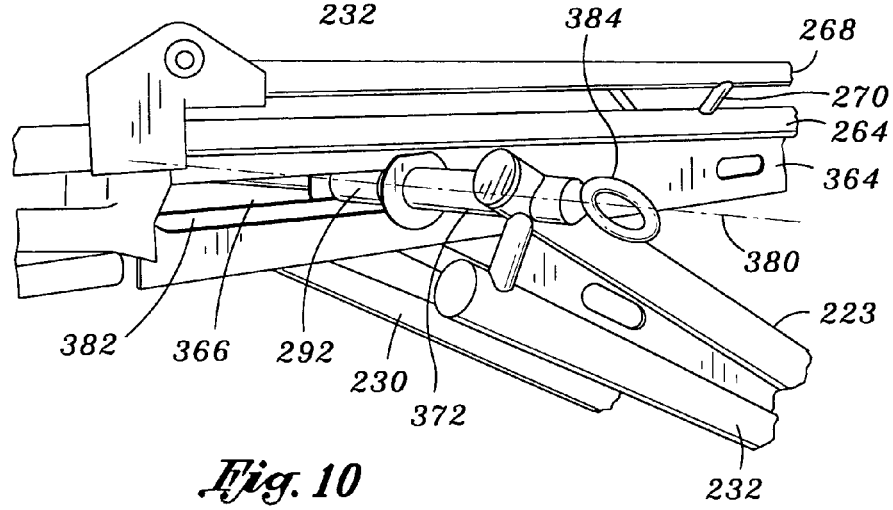

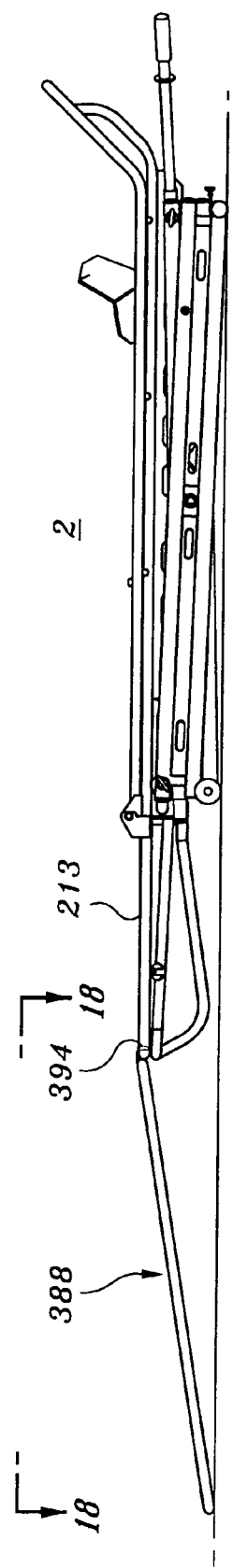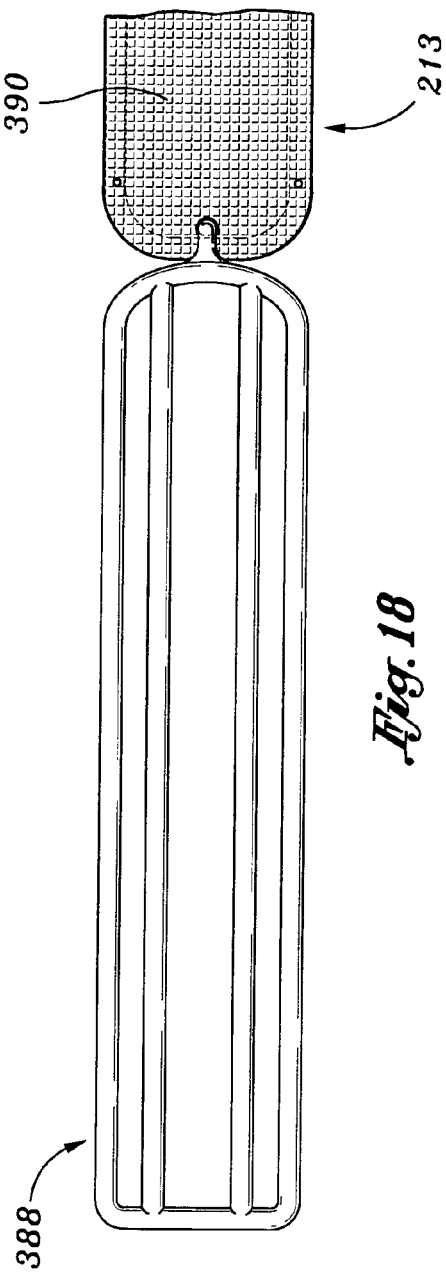

PORTABLE MOTORCYCLE LIFT

CROSS-REFERENCE TO RELATED APPLICATIONS

Not Applicable

STATEMENT RE: FEDERALLY SPONSORED RESEARCH/DEVELOPMENT

Not Applicable

BACKGROUND OF THE INVENTION

1. Field of the Invention

The present invention relates to the field of motorcycle stands and lifts. In particular, the present invention relates to motorcycle lifts which are portable and have a self-contained lifting system. Furthermore, the present invention relates to motorcycle lifts which may be folded or collapsed into a stowable package and transported similar to that of a lifting dolly.

2. Background of the Invention

As the popularity of motorcycles proliferates and the number of motorcycles on the road continues to increase, the demand for more refined tools/fixtures to work on the motorcycles also increases. A motorcycle is an inherently unstable device which is not capable of standing upright on its own, except with the assistance of a kickstand. Although the kickstand is the most well-known method of keeping a motorcycle upright, it does not provide a motorcycle sufficient stability when maintenance procedures are being performed on the motorcycle.

Typically, when maintenance or repair is being performed on a motorcycle, a stand or lift is the preferred method utilized to secure the motorcycle in a vertically upright position as compared to an inclined or tilting position that a kickstand offers. Furthermore, stands and lifts provide the mechanic with much greater access to maintenance areas of the motorcycle. From the mechanic's or owner's perspective, any stand or lift that is used on a motorcycle must be the utmost reliable. If the motorcycle falls over or falls off the lift during a maintenance procedure, an excessive amount of damage may be inflicted on the motorcycle. And, it is well-known that owners of motorcycles typically have a strong affinity towards their "bikes". Therefore, it is best that an inadvertent accident never occurs.

There are numerous motorcycle lifts and stands available on the market. Most designs are either small portable devices or large heavy-duty non-portable platforms. A first common design is a portable, compact lift which utilizes an expandable or folding parallelogram configured frame. This design typically incorporates a hydraulic bottle jack that provides a force to lift the expandable parallelogram configured frame from a non-deployed position to a deployed configuration. The bottle jack and lift are mounted on top of a low slung rectangular frame which has caster wheels on all four corners.

Although compact and portable, this type of lift has numerous drawbacks. For example, the upper surface of the lift which contacts the bottom of the motorcycle may be a general design which is not adapted for each individual motorcycle undercarriage. Thus, the lift may not necessarily be secured properly to the undercarriage of the motorcycle. This flaw is usually overcome when an adaptor is used in conjunction with the lift. For instance, a specific adapter may be required for a Harley-Davidson "Fatboy" model, while another specifically designed adapter may be required for a Honda "Goldwing" model. Another inherent disadvantage with this type of lift is that the height of which the motorcycle can be lifted is usually about eighteen inches or less. Many times, the mechanic prefers to stand upright while working to have better access and leverage while working on a region of the motorcycle or to just prevent back strain. Another disadvantage with this design configuration is stability. The lift and base frame merely act as a pedestal which is quite capable of being tipped over. Also, a further disadvantage is that the motorcycle must have a sufficient amount of clearance before the lift may be slid underneath the motorcycle. In fact, many motorcycles are a very low to the ground or have been lowered by customization, and as a result of the low clearance, the aforementioned lift is sometimes not even able to be positioned underneath the motorcycle.

Another type of lift design is a heavy duty lift which typically provides a large platform of which the motorcycle is placed upon and then elevated. In particular, expandable scissor-frame or parallelogram configured lifts are known which typically utilize a hydraulic device to elevate the platform of which the motorcycle is positioned upon.

This design also has several drawbacks and disadvantages. A first major drawback is that this style of lift is typically very large, and therefore, takes up a considerable amount of free workspace. Moreover, this type of lift is usually designed to not be portable and instead operates as a fixture. If the lift is designed to be portable, it is usually so bulky that the true portability of the lift is essentially limited to rolling the device within the shop. Another drawback of the heavy duty lift platform is that the motorcycle may only be supported by a front wheel cradle. Thus, even though the motorcycle has a large platform to be positioned upon, besides the front wheel cradle, there are no other means provided for securing the motorcycle upright. This configuration inherently presents the possibility of the motorcycle tipping over at a height even higher than the previous mentioned design.

It would be desirable to provide a motorcycle lift that overcomes the aforementioned disadvantages. Initially, an ideal motorcycle lift must provide a securing platform which essentially prevents the possibility of a motorcycle from being inadvertently tipped over and damaged. It would be advantageous to provide a lift which may be folded into a non-deployed compact configuration such that it may be easily stored. An ideal lift should also be highly portable. For instance, it would be desirable to provide a motorcycle lift which could be easily transported in the back of a pickup truck and setup at a motorcycle show or rally. However, an ideal motorcycle lift should be of a robust design and not be so small or lightweight that is it easily tipped over. Additionally, an ideal portable lift should have a self-contained lifting system which is not dependent on compressed air. Moreover, it would be advantageous to provide a lift which does not need specific adaptors for specific motorcycles, eliminates undercarriage clearance concerns, and is still economical to manufacture or purchase.

BRIEF SUMMARY OF THE INVENTION

The present invention specifically addresses and alleviates the above mentioned deficiencies associated in the prior art. In particular, a foldable or collapsible and portable tubular framed motorcycle lift is provided which is moderately light-weight, and yet, is capable of elevating even the heaviest motorcycles in a stabilized manner about three feet high, giving a mechanic comfortable work access to the most regions of the motorcycle. The motorcycle lift has a deployed configuration and a stowable non-deployed configuration which allows the lift to be transported similar to that of a lifting dolly.

The present invention utilizes a scissor frame configuration which includes an upper cradle support, an inner lifting structure, and outer lifting structure rotatably hinged about a common center fulcrum. To provide the required force to lift a large motorcycle, an articulated lifting system is provided which includes a jacking device, lifting arm, and linkage arm integrated within the inner and outer lifting structures. The lifting system may be self-contained, therefore, allowing true portability without the need for compressed air. Other features of the motorcycle lift include a bracing member, rear support section which may be configured to be removed for greater accessibility, a removable loading ramp to assist loading and offloading motorcycles, automatically setting wheel chock, remote jacking system and remote pressure release feature.

Additionally, the upper cradle support is specifically adapted to support at least one of the front and rear tires of a motorcycle. This design proves to be very reliable and substantially reduces the possibility of the motorcycle inadvertently tipping over. Moreover, cradle support is designed such that it will accept a wide variety of models of motorcycles, and therefore, eliminates the need for any specific adapters. Furthermore, the wheel chock is designed such that it is capable of holding the motorcycle in an upright position without the assistance of any other supporting devices such as a motorcycle kickstand. However, securing eyelets are provided on the lift for securing the motorcycle in an upright manner with tie-downs if so desired. Also, a removable and positionable auxiliary jacking device may be included in the upper support of the motorcycle lift to assist in lifting the motorcycle for special maintenance operations such as removal of the rear tire.

One embodiment of the present invention provides a portable motorcycle lifting device which includes an inner lifting structure having a first forward and first rearward end, an outer lifting structure having a second forward and second rearward end, an upper cradle support having a third forward and third rearward end, and an articulated lifting system integrated within the inner and outer lifting structures. The inner lifting structure is generally positioned within the outer lifting structure and both lifting structures are connected by a common fulcrum positioned approximately in the middle of each lifting structure. The first rearward end of the inner lifting structure is rotatably and slidably attached to the third rearward end of the upper support cradle. The second forward end of the outer lifting structure is rotatably attached to the third forward end of the upper cradle support. And, an articulated lifting system is included and may be operated to raise the upper cradle support from a non-deployed position to a fully deployed position.

According to an aspect of the instant embodiment, the first forward end of the inner lifting structure has a first transversely mounted cross member, and the second rearward end of the outer lifting structure has a second transversely mounted cross member. According to another aspect of the instant embodiment, the second cross member has a roller wheel assembly mounted to each end of the second cross member.

Moreover, according to another aspect of the instant embodiment, when the lifting device is deployed or reconfigured to the non-deployed position, the second cross member rolls on the floor surface and the first cross member stays in a stationary position. Furthermore, according to another aspect of the instant embodiment, the lifting device may be inclined and moved similar to that of a dolly. And yet another aspect of the instant embodiment includes the lifting device adapted to be stored a vertically upright position similar to that of a dolly. Another aspect of the instant embodiment includes the inner lifting structure, upper lifting structure, and upper cradle support being formed from light weight high-strength tubing.

According to another aspect of the instant embodiment, the upper cradle support has a generally channel shaped cross section adapted to receive at least the front tire of a motorcycle. According to a further aspect of the instant embodiment, the cradle support is adapted to support sidewalls of both tires. And yet a further aspect of the instant embodiment provides a cradle support which includes longitudinally and parallel oriented lower left and right support members and upper left and right support members, wherein the upper left support member is spaced above and laterally outward from the lower left support member and the upper right support member is spaced above and laterally outward from the lower right support member.

Additionally, the lower left and right support members are adapted to support a tread and ground contacting region of the motorcycle tires, and the upper left and right support members are adapted and positioned to support a sidewall region of the motorcycle tires. Furthermore, another aspect of the instant embodiment includes a wheel chock which is adapted to accept an incoming wheel without requiring any adjustment by the operator of the lifting device. The wheel chock is capable of maintaining the motorcycle in an upright position without the aid of any other device, such as the motorcycle's kickstand or tie-downs. Another aspect of the instant embodiment includes the third forward end of the upper cradle having an upwardly inclined portion which forms a forward tire cradle.

According to still another aspect of the instant embodiment, an articulated lifting system is provided. The articulated lifting system includes a hydraulic bottle jack having a base pivotally mounted about a jacking device axle mounted transversely in a forward region of the inner lifting structure, and a displacement arm which is adapted to be hydraulically pushed from the bottle jack and in which the displacement arm has a distal end. The lifting system further includes a lifting arm rotatably attached about the fulcrum, wherein the lifting arm has a forward portion and a rearward portion, and the forward portion pivotally attaches to the distal end of the displacement arm. The lifting system also includes a rearward linkage arm having one end pivotally attached to the rearward portion of the lifting arm, and another end pivotally attached to the second rearward end of the outer lifting structure.

Other aspects of the instant embodiment include a bottle jack which is operable by a hand lever and which is not dependent on compressed air. And yet another aspect of the present invention includes the articulated lifting system being positioned in a generally straight configuration within the inner and outer lifting structure when the motorcycle lifting device is in the non-deployed position. Moreover, another aspect includes the inner and outer lifting structures being oriented in a generally parallel manner with respect to each other when the motorcycle lifting device is in the non-deployed position.

And according to still further aspects of the instant embodiment, a rear support section is attached to the rearward end of the upper cradle support. Yet another aspect of the present invention includes the rear support section being rotatably attached to the upper cradle support such that the rear support section may be folded upwards and positioned next to the upper cradle support when the lifting device stored in a vertical position. And, another aspect of the present invention includes a bracing member which is rotatably attached to the rearward end of the upper cradle support and of which may be engaged with the second transversely mounted cross beam.

Another embodiment of the present invention is provided which is a portable motorcycle lifting device. The device includes an inner lifting structure having a first forward and first rearward end, an outer lifting structure having a second forward and second rearward end, and an upper cradle support having a third forward and third rearward end. The lift also includes an articulated lifting system integrated within the inner and outer lifting structures, wherein the inner lifting structure is generally positioned within the outer lifting structure and both lifting structures are connected by a common fulcrum positioned approximately in the middle of each lifting structure. The second rearward end of the outer lifting structure is rotatably and slidably attached to the third rearward end of the upper support cradle. The first forward end of the outer lifting structure is rotatably attached to the third forward end of said upper cradle support. The lift also includes an articulated lifting system which may be operated to raise the upper cradle support from a non-deployed position to a fully deployed position.

According to one aspect of the instant embodiment, the first rearward end of the outer lifting structure has a first transversely mounted cross member, and the second forward end of the outer lifting structure has a second transversely mounted cross member. According to another aspect, the first cross member has a roller wheel assembly mounted to each end of said first cross member. Another aspect of the instant embodiment entails the first cross member rolling on the floor surface via the roller wheel assemblies and the second cross member staying in a stationary position when the lifting device is deployed or reconfigured to the non-deployed position. According to another aspect of the instant embodiment, the lifting device may be moved similar to that of a dolly and may be stored in a vertically upright position similar to that of a dolly. Moreover, the inner lifting structure, outer lifting structure, and upper cradle support may be formed from light weight high-strength tubing.

According to another aspect of the instant embodiment, the upper cradle support has a generally channel shaped cross section adapted to receive at least the front tires of a motorcycle. Furthermore, the cradle support may be adapted to support sidewalls of both tires. According to yet another aspect of the present invention, the upper cradle support includes longitudinally and parallel oriented lower left and right support members and upper left and right support members, wherein the upper left support member is spaced above and laterally outward from the lower left support member and the upper right support member is spaced above and laterally outward from the lower right support member. Moreover, the lower left and right support members may be adapted to support a tread and ground contacting region of the motorcycle tires, and the upper left and right support members are adapted and positioned to support a sidewall region of the motorcycle tires.

According to another aspect of the instant embodiment, the upper cradle support further includes a wheel chock, wherein the wheel chock adapted to accept an incoming wheel without requiring any adjustment by the operator of the lifting device. Another aspect of the instant embodiment also includes the third forward end of the upper cradle having an upwardly inclined portion which forms a forward tire cradle.

Moreover, the instant embodiment of the present invention further includes an articulated lifting system. The system includes a hydraulic bottle jack having a base pivotally mounted about a jacking device axle mounted transversely in a rearward region of the inner lifting structure, and a displacement arm which is adapted to be hydraulically pushed from the bottle jack, the displacement arm having a distal end; a lifting arm rotatably attached about the fulcrum, the lifting arm having a forward portion and a rearward portion, the rearward portion pivotally attached to the distal end of the displacement arm; and a forward linkage arm having one end pivotally attached to the forward portion of the lifting arm, and another end pivotally attached to the second forward end of the outer lifting structure. According to another aspect of the instant embodiment, the bottle jack is operated by a remote jacking system including a jacking arm attached to a jacking arm axle housing, a jacking leverage arm connected to the axle housing, and a jacking linkage arm having one arm articulately linked to the leverage arm and another end articulately linked to a jacking input of the hydraulic bottle jack.

And yet another aspect of the instant embodiment includes a remote pressure release feature including a cable having a flexible inner turning element with one end connected to a bleed valve on the hydraulic bottle jack, and another end attached to a first end of an inner rotatable rod rotatably housed in a longitudinal housing, and a thumb wheel knob attached to a second end of the inner rotatable rod.

Another aspect of the present invention may include an alternative embodiment of the remote pressure release feature which includes an articulated arm comprising at least two segments having a swivel joint therebetween each of the at least two segments, wherein the articulated arm has a first end swivel attached to a bleed valve on the hydraulic bottle jack, and a thumb wheel knob attached to a second end of said articulated arm.

Other aspects of the instant embodiment include when the motorcycle lifting device is in the non-deployed position, the articulated lifting system is positioned in a generally straight configuration within the inner and outer lifting structure. Also, when the motorcycle lifting device is in the non-deployed position, the inner and outer lifting structures are oriented in a generally parallel manner with respect to each other. Furthermore, the inner and outer lifting structures form a scissor frame.

Another aspect of the instant embodiment includes a rear support section attached to the rearward end of the upper cradle support, wherein the rear support section has a vertically oriented lower ramp support formed from a tubular member having a substantial bend forming an elbow which is adapted to contact the ground for support when a motorcycle is being loaded onto the motorcycle lift. The rear support section may have an upper support plate attached to the upper side of the rear support section. The rear support section may be rotatably attached to the upper cradle support such that it may be folded upwards and positioned next to the upper cradle support when the lifting device is stored in a vertical position. Furthermore, another aspect of the present invention includes a bracing member which is hingedly attached to an upper forward end of the inner lifting member and which may be engaged with one of a series of catches positioned on an upper forward portion of the outer lifting structure.

Additionally, another aspect of the present invention includes a removable ramp adapted to be attached to a rearward portion of the rear support section and further adapted to contact the ground. The removable ramp may include a tubular frame structure having a generally rectangular and planar shape, and a ramp hook attached to an end of the ramp for attachment to the rear support section.

Other exemplary embodiments and advantages of the present invention may be ascertained by reviewing the present disclosure and the accompanying drawings.

BRIEF DESCRIPTION OF THE DRAWINGS

The present invention is further described in the detailed description that follows, by reference to the noted drawings by way of non-limiting examples of preferred embodiments of the present invention, in which like reference numerals represent similar parts throughout several views of the drawings, and in which:

FIG. 1 is a front perspective view of an exemplary embodiment of the portable motorcycle lift in a deployed configuration;

FIG. 2 is a rear perspective rear view of the exemplary embodiment of the portable motorcycle lift in a deployed configuration;

FIG. 4 is a top view of the exemplary embodiment of the motorcycle lift in the deployed position;

FIG. 5 is a bottom view of the exemplary embodiment of the motorcycle lift in the deployed position;

FIG. 9 is a front perspective view of a second exemplary embodiment of the portable motorcycle lift in a deployed configuration;

FIG. 10 is a partial perspective view of a slidable and rotatable joint on the rearward end of the second exemplary embodiment, according to an aspect of the present invention;

FIG. 17 is a side view of the second exemplary embodiment of the motorcycle lift in a collapsed position having a removable ramp attached the end of the rear section; and FIG. 18 is a top view of the removable ramp from FIG. 17.

DETAILED DESCRIPTION OF THE INVENTION

Figure 3A:
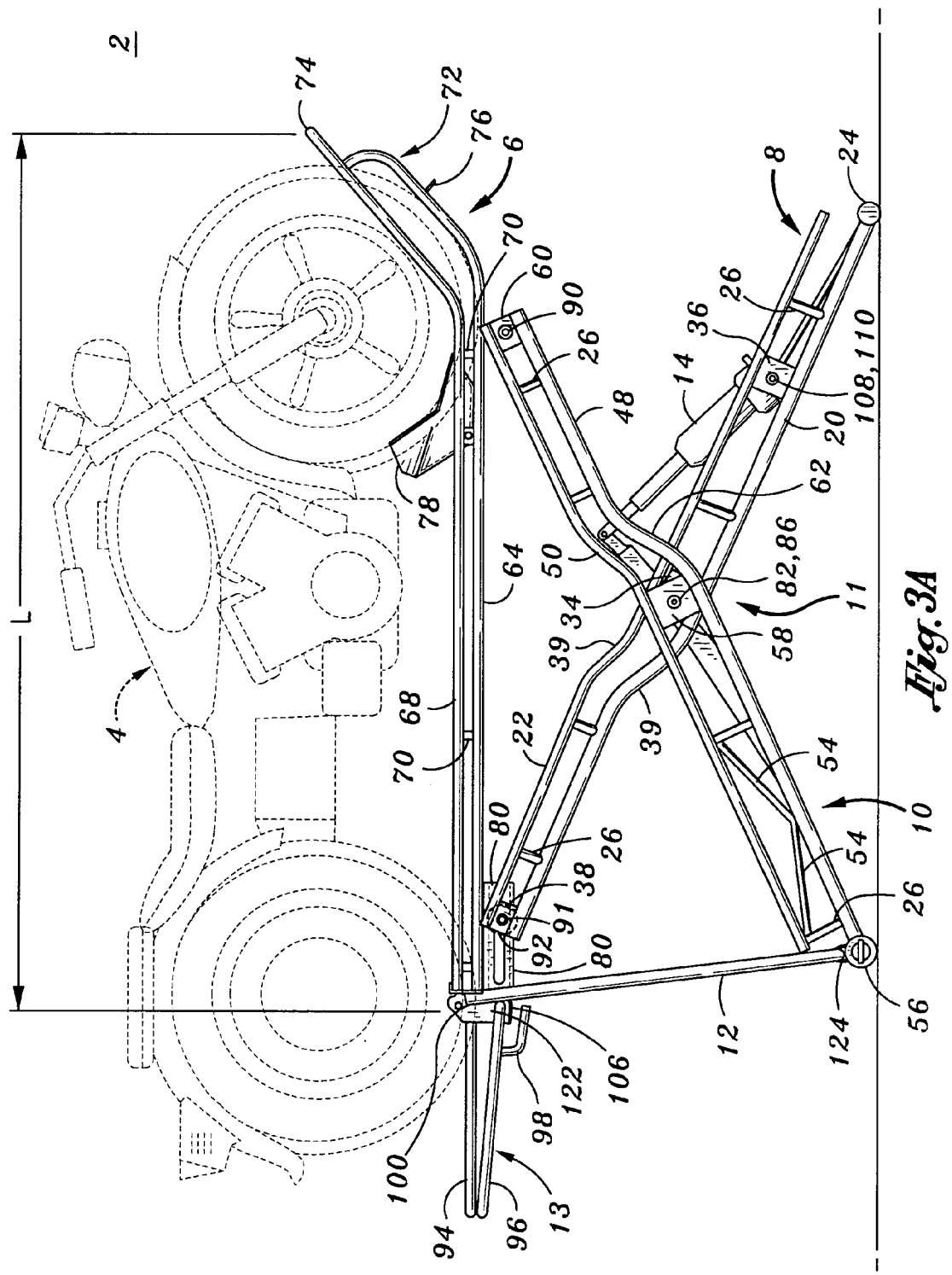
FIG. 3A is a right side view of the exemplary embodiment of the motorcycle lift in a deployed position with a motorcycle mounted thereon.

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

First Exemplary Embodiment of the Portable Motorcycle Lift

Overview of the First Exemplary Embodiment

FIGS. 1 through 8B illustrate an exemplary embodiment of the portable motorcycle lift 2. Motorcycle lift 2 utilizes a scissor frame configuration. The scissor frame includes an upper cradle support 6, an inner lifting structure 8, and outer lifting structure 10 rotatably hinged about a common center fulcrum 11 (see FIG. 3A). Motorcycle lift 2 has a deployed configuration (see FIGS. 1 through 7) and a folded, stowable non-deployed configuration which allows the lift 2 to be transported similar to a dolly (see FIGS. 8A–B). To provide the required forces to lift a large motorcycle, an articulated lifting system 5 (see FIG. 3B) is provided which includes a jacking device 14, lifting arm 16, and linkage arm 18 which are integrated within the inner and outer lifting structures 8, 10. Other features of motorcycle lift 2 include a bracing member 12, rear support section 13, and well chock 78. Additionally, the first embodiment may utilize a removable ramp, remote jacking system and remote pressure release system (the description of these features are included in the description of the second exemplary embodiment).

The aforementioned components and other features of the present invention will first be described in the specification. After each component is individually described, the integration of the components will be explained. Finally, a description is provided which explains the functionality of the present invention and how the lift is operated.

Inner Lifting Structure of the First Exemplary Embodiment

Inner lifting structure 8 comprises an inner left rail 30 and an inner right rail 32 which are laterally spaced from each other and positioned parallel to one another (see FIG. 1). Inner left rail 30 includes an inner lower left member 20 and inner upper left member 22. Inner right rail 32 includes an inner lower right member 21 and an inner upper right member 23. Upper members 22, 23 are vertically positioned directly above and parallel to respective lower members 20, 21. Lower members 20, 21 and upper members 22, 23 are preferably made from light weight high-strength metal tubing, for example a high-strength steel or aluminum alloy. For weight reduction, upper members 22, 23 are preferably made from tubing having a smaller diameter than the tubing diameters of lower members 20, 21.

Upper left and right members 22, 23 are connected to respective lower left and right members 20, 21 by a plurality of vertical support struts 26. Horizontal cross members 28 are utilized to tie lower left and right members 20, 21 together to form a ladder-like structure (see FIG. 1). A first lower cross beam 24 is transversely oriented and connected the forward distal ends of lower members 20, 21. Preferably, vertical support struts 26 and horizontal crossmembers 28 are constructed from tubing having a diameter smaller than the diameter of upper members 22, 23 for further weight reduction considerations. Also, preferably, cross beam 24 is made from tubing having a diameter greater than the diameter of lower members 20, 21 for rigidity and strength considerations.

A series of rail braces 34, 36, 38 are connected between lower members 20, 21 and upper members 22, 23 (see FIG. 2 and 3A). In particular, a first pair a braces 34 are positioned about in the middle of inner lifting structure 8 and are utilized as part of the mounting structure for fulcrum assembly 11. A second pair of rail braces 36 are utilized as part of the mounting structure for jacking device 14, and a third pair of rail braces 38 are utilized as part of the connecting features utilized to movably connect inner lifting structure 8 to main support platform 6. Braces 34, 36, 38 are preferably made from plate stock.

Another feature of inner lifting structure 8 is an upward offset 39 which is best illustrated in FIG. 3A. It is further noted that the rail height dimension of inner rails 30, 32 is less between center fulcrum assembly 11 and the third pair of rail braces 38, than the rail height between center fulcrum assembly 11 and the second pair of rail braces 36.

Outer Lifting Structure of the First Exemplary Embodiment

Outer lifting structure 10 comprises an outer left rail 40 and an outer right rail 42 (see FIG. 2) which are laterally spaced apart from each other and positioned parallel to one another. Outer left rail 40 includes an outer lower left member 44 and an outer upper left member 46. Outer right rail 42 includes an outer lower right member 48 and an outer upper right member 50. For both outer rails 40, 42, upper members 46, 50 are vertically positioned vertically above and parallel thereto lower members 44, 48. Similar to inner lifting member 8, both lower members 44, 48 and upper members 46, 50 are preferably, made from light weight high-strength metal tubing, for example a high-strength steel or aluminum alloy. For weight reduction, the diameter of upper members 46, 50 are preferably made from tubing having a smaller diameter than the diameter of the tubing of lower members 44, 48.

Outer upper left and right members 46, 50 are respectively connected to outer left and right lower members 44, 48 by a plurality of vertical support struts 26. Angularly inclined struts 54 are further connected between two vertical support struts 26 positioned on a rearward portion of outer lifting structure 10, forming a v-shape (see FIG. 3A). Moreover, a second lower cross beam 52 is transversely oriented and connected the rearward distal ends of lower left and right members 44, 48 (see FIG. 2). A roller wheel assembly 56 is mounted to each distal end of cross beam 52 which allows cross beam 52 to roll as motorcycle lift 2 is being deployed upwards or repositioned to the floor surface. Similar to inner lifting structure 8, vertical support struts 26 and inclined struts 54 are constructed of tubing having a diameter less than the diameter of upper members 46, 50 for further weight reduction considerations. Also, preferably lower cross beam 52 is made from tubing having a diameter greater than the diameter of lower members 44, 48. Preferably, the wheels of assembly 56 are constructed of a durable steel rated for industrial applications; however, the wheels may be composed of resilient matter such as urethane, rubber, plastic or other materials known in the art for manufacturing wheels.

A couple pair of rail braces 58, 60 (see FIG. 3A) are interconnected between lower members 44, 48 and upper members 46, 50. In particular, a fourth pair a braces 58 are positioned proximate about half the length of outer lifting structure 10 and are utilized as part of the mounting structure for the fulcrum assembly 11. A fifth pair of rail braces 60 are included as part of the connecting features utilized to rotatably connect the forward portion of outer lifting structure 10 to a forward portion main support platform 6. Braces 58, 60 are preferably made from plate stock.

Another feature of outer lifting structure 10 is an upward offset 62 which is best illustrated in FIG. 3A. It is further noted that length the rail height dimension of outer rails 40, 42 is less between center fulcrum assembly 11 and the fifth pair of rail braces 60, than the rail height between center fulcrum assembly 11 and second lower cross beam 52.

Support Platform of the First Exemplary Embodiment

Upper cradle support 6 is adapted to receive at least one of the front and rear wheel of a motorcycle 4. When deployed, cradle support 6 is in a substantially horizontal position. As shown in FIG. 2, support platform 6 has a width W which is adapted to receive a motorcycle tire. It is noted that width W may vary with respect to differing embodiments of the present invention. For instance, the width of a rear tire of a custom motorcycle may be substantially greater than the width of a rear tire for a production motorcycle. Therefore, various embodiments of the present invention may be provided which are configured for motorcycles having tires within specific ranges of tires widths. Similarly, the length L (see FIG. 3A) of upper cradle support 6 may vary with respect to varying wheel base lengths of motorcycles. For instance, the wheelbase of a custom chopper is substantially longer than the wheelbase of a stock production motorcycle. Therefore, various embodiments of the present invention may be provided which are configured for motorcycles 4 having various wheelbase lengths according to the type of motorcycle.

Upper cradle support 6 comprises a lower left support member 62, lower right support member 64, an upper left support member 66 and upper right support member 68, all of which are longitudinally oriented and positioned parallel with respect to each other. As best shown in FIGS. 1 and 2, lower support members 62, 64 are positioned laterally next to each other in a same horizontal plane. Similarly, upper members 66, 68 are positioned laterally next to each other and in another horizontal plane; however, upper members 66, 68 are positioned above lower support members 62, 64 and wider apart than lower support members 62, 64. Lower support members 62, 64 and upper members 66, 68 are preferably, made from light weight high-strength metal tubing, for example a steel alloy or a high strength aluminum. The diameters of lower support members 62, 64 and upper members 66, 68 are preferably equivalent to the diameters of upper members 22, 23 of inner lifting structure 8 and upper members 46, 50 of outer lifting structure 10.

Cradle support struts 70 are utilized to interconnect lower support members 62, 64 to upper members 66, 68. As a result, a u-shaped channel is provided which is adapted to receive at least one of the front and rear tire of motorcycle 4 when the motorcycle 4 is positioned inside upper cradle support 6. A forward tire cradle 72 is provided on the forward end of support platform 6. Tire cradle 72 is formed by bending lower support members 62, 64, and upper support members 66, 68 upwardly according an acute angle e (see FIG. 3B). As best illustrated in FIGS. 1 and 2, upper support members 66, 68 are connected together forming cradle arch portion 74 and lower members 62, 64 are bent such that they are connected to upper support members 66, 68 at a position before the formation of arched portion 74. A pair of ears 76 each having an eyelet are connected to the lowerside of the inclined portion of lower support members 62, 64. And a pair of u-shaped slotted connecting braces 80 are attached to the rearward end of cradle support 6 underneath the lower support members 62, 64, the function of which will be detailed later in the specification.

A wheel chock 78 is attached to upper cradle support 6 which is utilized to ensure that the tire loaded into the forward tire cradle 72 is properly supported. Wheel chock 78 has a general triangular shape which is adapted to conform to the curvature of a motorcycle wheel. Wheel chock 78 is rotatably mounted with a bracket structure such that chock 78 will automatically accept the entering wheel, and furthermore, flip over to support the back of the tire when the tire is rolled over chock 78. A feature of the wheel chock 78 is that it is capable of holding the motorcycle 4 in an upright position without the assistance of any other bracing member, kickstand, or tie-downs. This feature will be discussed in greater detail later in the specification.

Integration of Support Platform, Inner Structure, and Outer Lifting Structure of the First Exemplary Embodiment The following paragraphs describe how upper cradle support 6, inner lifting structure 8, and outer lifting structure 10 are interconnected to and integrated with each other. Inner lifting structure 8 and outer lifting structure 10 are connected at center fulcrum 11 which defines a fulcrum axis 82. Inner lifting structure 8 is designed such that it fits within outer lifting structure 10 so that inner lifting structure 8 and outer lifting structure 10 may be rotated with respect to each other about center fulcrum 11.

A fulcrum axle housing 84 (see FIGS. 1 and 4–7) is mounted inside inner lifting structure 8 transversely between the first pair of rail braces 34 which have apertures positioned about fulcrum axis 82. Thus, axle housing 84 is also positioned about fulcrum axis 82. The fourth pair of braces 58, which are attached to outer inner structure 10 provide apertures to receive a fulcrum axle 86 which rotatably fits within axle housing 84. The result is center fulcrum assembly 11 which comprises at least fulcrum axle 86 and axle housing 84 which secure outer lifting structure 10 and inner structure 8 together such that axle housing 84 may rotate about axle 86, both of which are centered about fulcrum axis 82.

The forward end of outer lifting structure 10 is rotatably attached to the forward end of support platform 6 using a forward axle housing 88 (see FIG. 1 and 7) which is attached to the fifth pair of braces 60 which provide apertures to receive a forward axle 90 which rotatably fits within forward axle housing 88. The result is a joint or hinge which comprises at least an axle 90 and housing 88 which secures the forward end of outer lifting structure 10 and to the forward end support platform 6 together, such that axle housing 88 may rotate about axle 90.

The rearward end of inner lifting structure 8 is rotatably and slidably attached to the rearward end of support platform 6. Slotted connecting braces 80 are positioned such that the u-shape channels are facing inward (see FIGS. 1 and 3A–B). Roller 92 is positioned within both of the u-shaped channels provided by slotted connecting braces 80. A rearward axle 91 is received through apertures on the third pair of rail braces 38 and through roller 92 to secure the rearward end inner lifting structure 8 to the rearward end support platform 6. As a result, roller 92 is maintained within the u-shaped channels provided by connecting braces 80 and the rearward end inner lifting structure 8 is adapted to movably slide within slotted connecting braces 80.

Lifting System of the First Exemplary Embodiment

Figure 3B:
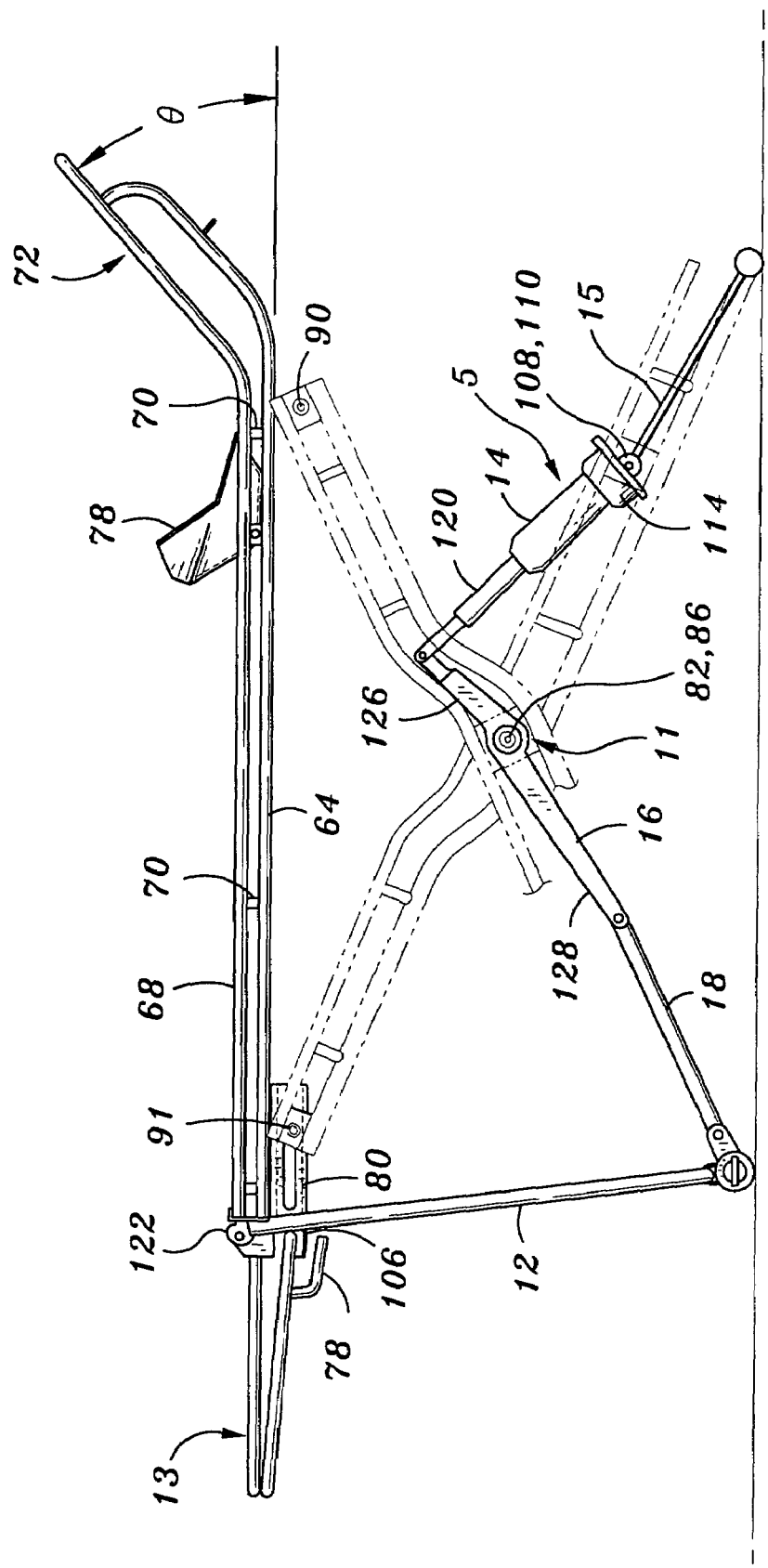
FIG. 3B is the same side view as shown in FIG. 3A, and further showing details of the articulated lifting system.
Figure 6:
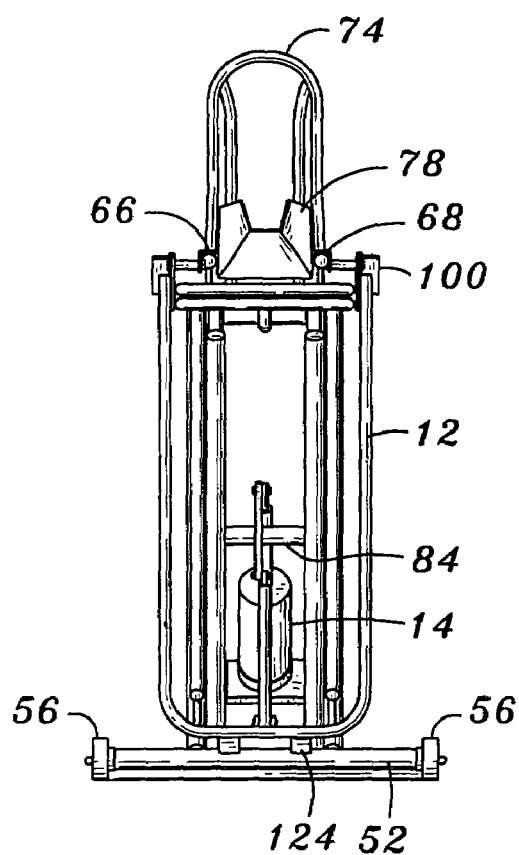
FIG. 6 is a rear view of the exemplary embodiment of the motorcycle lift in the deployed position.
Figure 7:
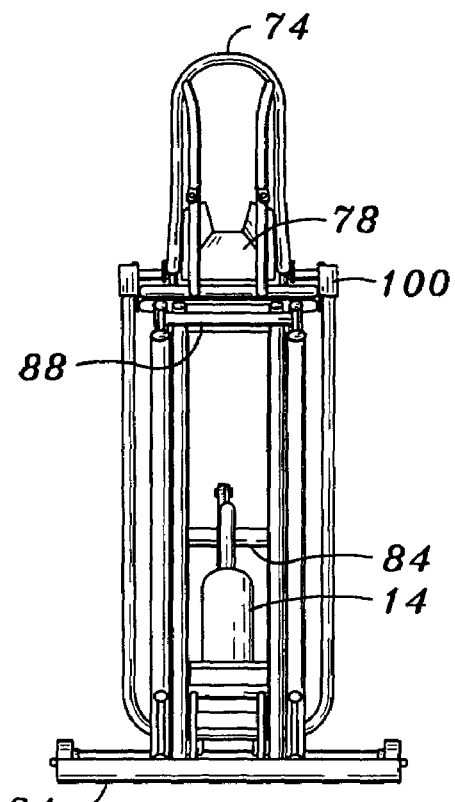
FIG. 7 is a front view of the exemplary embodiment of the motorcycle lift in the deployed position.

The articulated lifting system 5 of the exemplary embodiment is best illustrated in FIG. 3B. Lifting system 5 comprises at least a jacking device 14, a lifting arm 16, a rearward linkage arm 18, and a jack brace 15. Lifting system 5 is positioned partially within the forward portion of the inner lifting structure 8 and partially within the rearward portion of outer lifting structure 10. Lifting arm 16 is rigidly connected (e.g. welded) to fulcrum axle housing 84. Thus, lifting arm 16 and fulcrum axle housing 84 act as a unitary member which rotates or revolves around fulcrum axle 86 which is centered along and about fulcrum axis 82.

The jacking device 14 of the instant embodiment is a hydraulic bottle jack which may be operated by a hand lever. With this unit, a five inch travel movement from the jacking device displacement arm 120, results in about a thirty-two inch lift with respect to the distance upper cradle support 6 travels upwards. It is noted, however, the present invention may utilize a variety of other jacking devices and/or jack configurations, and therefore, should not be limited to the specific jacking device utilized in the instant exemplary embodiment. For example, jacking device 14 may be a floor positioned long ram bottle jack which utilizes a floor pedal instead of a hand lever. Jacking device 14 may be pneumatically pressurized with compressed air instead of utilizing a hydraulic device. Or jacking device 14 may be of a conventional threaded or ratcheted design which is driven manually without the assistance of hydraulics or pneumatics.

In the instant embodiment, jacking device 14 is mounted to a backing plate 114. In particular, a jacking device axle 110 is received within apertures provided in the second pair of rail braces 36. Backing plate 114 is attached to a jacking device axle housing 112 (see FIG. 1) which is adapted to rotate or revolve about jacking device axle 110. Jack brace 15 is configured as an h-shaped strut which is attached to jacking device axle 110 by fixed axle housing portions 118 such that jack brace 15 is non-rotatable. The opposing ends of the h-shape strut, are furthermore, attached to stationary lower cross beam 24. As a result, whenever jacking device 14 is being utilized, axle 10 provides a structural cross member that allows jacking device 14 to partially rotate about the joint similar to a door hinge, while the h-shaped strut provides a backing force which prevents any undesirable bending of jacking device axle 110.

As shown in FIG. 3B, the distal end of jacking device displacement arm 120 is swivel attached to a forward portion 126 of lifting arm 16. As previously mentioned, lifting arm 16 is rigidly connected (e.g. welded) to fulcrum axle housing 84, and therefore, lifting arm 16 and fulcrum axle housing 84 act as a unitary member which rotates or revolves around fulcrum axle 86 which is centered along and about fulcrum axis 82. The rearward portion 128 of lifting arm 16 is attached to a rearward linkage arm 18. The other end of rearward linkage arm 18 is swivel attached to second lower cross beam 52. The function of articulated lifting system 15 will be discussed in greater detail later in the specification.

Additionally, the first embodiment may utilize a remote jacking system and remote pressure release system (the description of these features are included in the description of the second exemplary embodiment).

Bracing Member of the First Exemplary Embodiment

A bracing member 12 which has a u-shape is utilized as an added safety measure to provide a rigid structural member between upper cradle support 6 and second lower cross beam 52. The use of bracing member 12 relieves articulated lifting system 5 from bearing the load of the motorcycle 4 once bracing member 12 is positioned between upper support cradle 6 and lower cross beam 52. Each upwardly projecting arm of the u-shaped brace 12 is attached to a bracing member bracket 122 which is attached contiguously to loading ramp hinge assemblies 100. Thus, both rear support section 13 and bracing member 12 rotate about a common axis. Attached to the lower end of bracing member 12 are a plurality of securing brackets 124 which are adapted to engage lower cross beam 52.

Rear Support Section of the First Exemplary Embodiment

A rear support section 13 is another feature of the present invention. The rear support section 13 is preferably formed from tubing of a similar diameter to that utilized for upper cradle support 6. Rear support section 13 is composed of at least an upper support portion 94, lower support portion 96, longitudinal supports 102, angled bracket 106, a pair of hinge assemblies 100, and a foot stop 98.

Rear support section 13 has a generally rectangular shaped when view from above with a width slightly wider than the width of outer lifting structure 10 (see FIG. 4). Upper rear support portion 94 is located directly above lower rear portion 96. Furthermore, lower rear support portion 96 is slightly downwardly declined to form an acute angle between the upper portion 94 and lower portion 96 (see FIG. 3A). At the entering end of the rear support section 13, upper portion 94 and lower portion 96 are connected directly together. The opposing end of rear support section 13 is hinged to upper cradle support 6 by hinge assemblies 100. Angled bracket 106 is utilized to provide a downwardly projecting structure for the tapered end of lower rear support portion 96 to be attached thereto.

A pair of longitudinal support struts 102 are oriented in a parallel manner within rear support section 13 such that they are aligned with the longitudinal length of upper cradle support 6 and spaced apart such they will support a motorcycle tire when it is rolled upon the longitudinal support strut 102. Hinge assemblies 100 are designed so that upper rear support portion 94 may be deployed in substantially a same plane as defined by lower support members 62, 64 of cradle support 6. Thus, is can be seen that longitudinal support struts 102 are spaced similarly to the spacing between support members 62, 64 and generally follow along the same line defined by support members 62, 64. A feature of the hinge assemblies 100 is that they allow rear support section 13 to be rotated upwards when the motorcycle lift 4 is being stored (see FIGS. 8A–B). To help keep the rear support section 13 in a stowed vertical upright position, a foot 98 is attached to the bottom of the angled bracket 106. Moreover, another feature of the rear support section is that it may be removed from the motorcycle lift 2 to allow for greater access to the rearend of the motorcycle 4.

Operation of the First Exemplary Embodiment

The functionality and operational aspects of the exemplary embodiment of the portable motorcycle lift 2 are now describe below. In particular, the following paragraphs will describe the portable motorcycle lift 2 when in it is initially in its collapsed and stored state. Then the process of deploying lift 2, including loading motorcycle 4 thereon and utilizing articulated lifting system 5 to fully deploy upper cradle support 6 will explained.

Figure 8A:
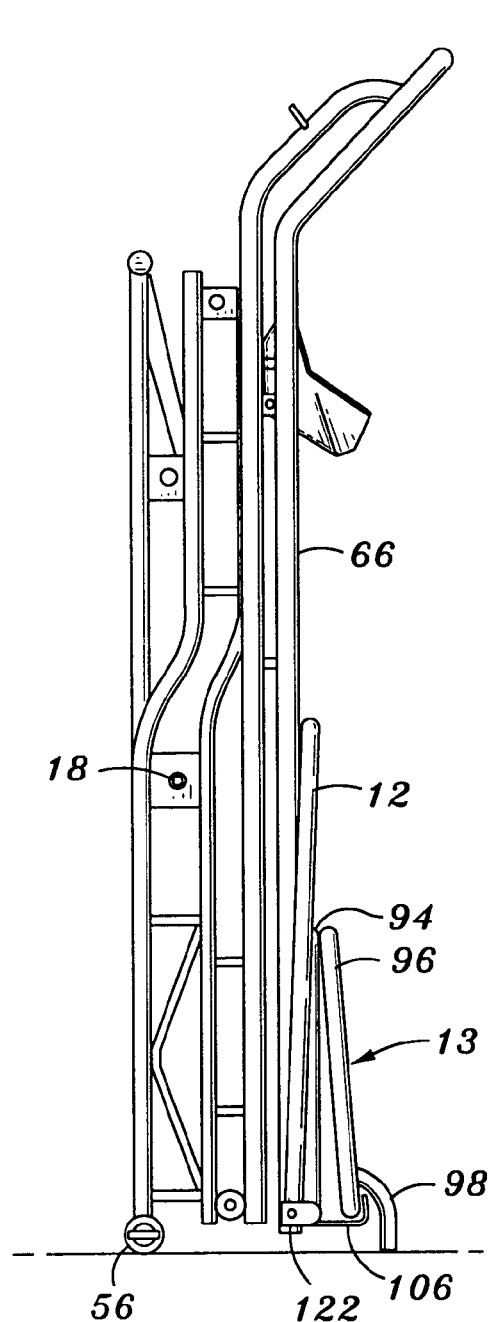
FIG. 8A is a side view of the exemplary embodiment of the motorcycle lift in a folded and vertically upright position.
Figure 8B:
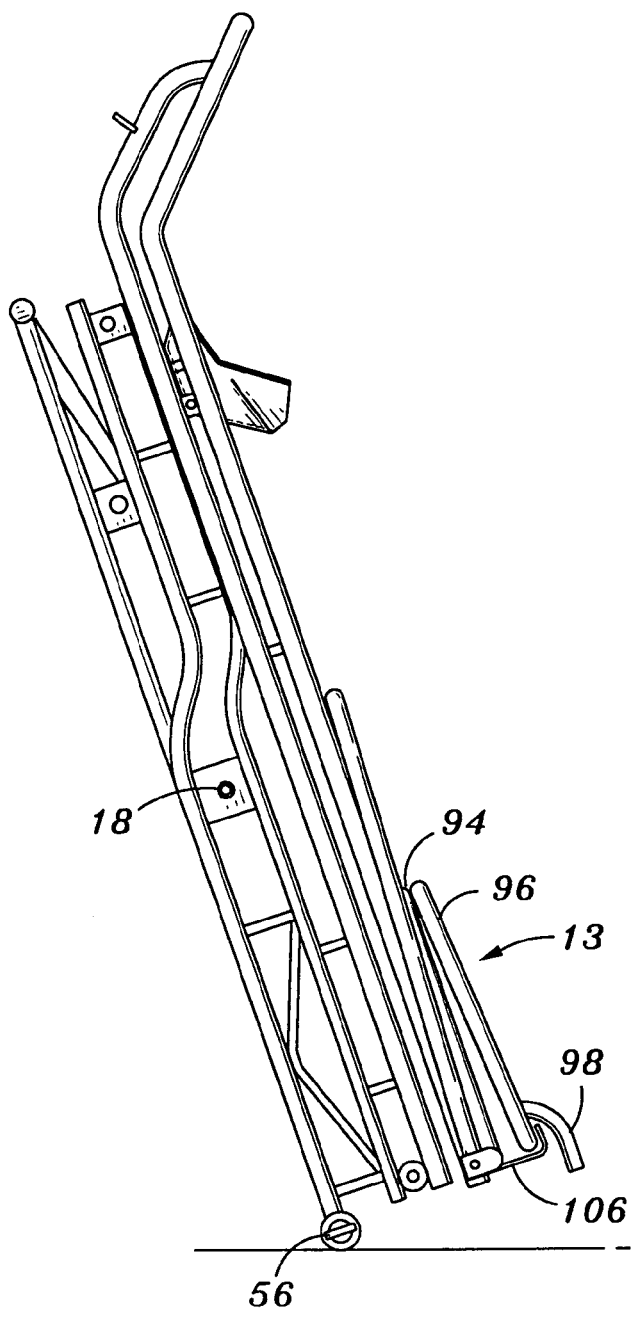
FIG. 8B illustrates an aspect of the present invention which allows the motorcycle lift to be transported similar to a dolly.

FIG. 8A depicts motorcycle lift 2 in a vertically upright, collapsed and stored state. In the collapsed state, inner lifting structure 8 is generally contained within outer lifting structure 10 in a parallel orientation. Also, upper cradle support 6 is positioned next to both inner lifting structure and outer lifting structure 10. Furthermore, rear support section 13 is in a fully stowed position such that upper ramp portion 94 is contiguous with and parallel to support members 66, 68. Moreover, foot stop 98 acts as a stabilizing leg to assist in maintaining motorcycle lift 2 in an upright position by engaging the floor surface. Also, bracing member 12 is placed in a stowed position, in which it is folded upwardly until the distal end of member 12 is positioned proximate a middle region of cradle support 6 and next to support members 64, 66. As a result of the lift's efficient vertically storable packaged design, the amount of shop floor space that is normally utilized by other prior art devices is substantially decreased. Furthermore, when fully collapsed, motorcycle lift 2 essentially conforms to the dimensions of a dolly and may be moved about in a similar fashion as a dolly to a convenient storage space, for instance, a closet or corner (see FIG. 8B).

To deploy portable motorcycle lift 2, the operator tilts lift 2 backwards (see FIG. 8B) such that lift 2 is supported only on roller wheels 56 and moves lift 2 in a similar manner as a dolly to the work area in which the lift will be deployed. Then lift 2 should be laid down on the floor with cradle support 6 facing upwards. Bracing member 12 is lifted up and rotated about hinge assemblies 100 such that member 12 is extended beyond the rearward position of lift 2. In the same manner, rear support section 13 is rotated about hinge assemblies 100 such that lower ramp portion 96 is positioned relatively close to the floor surface and such that upper ramp portion 94 and longitudinal support struts 102 provide a ramp surface for motorcycle 4 to be wheeled upon and over when motorcycle 4 is being installed into upper cradle support 6.

At this point, motorcycle 4 is ready to be installed into the upper cradle support 6. Initially, motorcycle 4 should be rolled onto and rear support section 13, preferably front wheel first. Then motorcycle 4 is rolled forward into upper support cradle 6. The wheel first introduced into cradle support 6 is next rolled over wheel chock 78. Wheel chock 78 is designed to flip over when the tire engages chock 78. When the wheel engages and rolls over wheel chock 78, the chock flips over such that it will then cup the backside of the first introduced wheel. This feature automatically assists the operator in establishing a secure support behind the first introduced tire without requiring the operator to actually independently install chock 78 himself/herself. At this stage, the first introduced wheel should be fully positioned and supported within forward tire cradle 72. As noted previously, the design of upper cradle support 6 is adapted to support at least the front tire of the motorcycle 4 sufficiently such that motorcycle 4 will be maintained in an upright position. In particular, the wheel chock 78 is capable of independently supporting the motorcycle 4 in an upright position by itself.

Once motorcycle 4 is loaded and secured within cradle support 6, the operator may initiate deployment of motorcycle lift 2 to a fully elevated position. In the exemplary embodiment depicted in FIGS. 1–8, a hydraulic bottle jack is utilized as the jacking device 14. The bottle jack is operated using hand lever. As mentioned earlier, by utilizing a bottle jack, a five inch travel movement results in about a thirty-two inch lift with respect to the distance that cradle support 6 is elevated upwards to a deployed position.

The following paragraph will now explain the dynamics of articulated lifting system 5 which is best shown in FIG. 3B. With respect to the instant embodiment which utilizes a bottle jack as the jacking device 14, when the hand lever is jacked, displacement arm 120 will extend out from the bottle jack body. As displacement arm 120 is hydraulically forced from the bottle jack body, reactive forces between the forward portion 126 of lifting arm 16 and the distal end of displacement arm 120, causes forward portion 126 to rise upwardly counterclockwise while simultaneously the rearward portion 128 of lifting arm 16 revolves about fulcrum axis 82 in a counterclockwise direction. As previously mentioned, jacking device 14 is attached to axle housing 112 such that it may slightly rotate about axle 110. Thus, the distal end of displacement arm 120 of jacking device 14 rises also rises upwardly with forward portion 126 of lifting arm 16. The upward movement of both lifting arm 126 and jacking device 14 essentially reduces the distance between fulcrum axis 82 and jacking device swivel axis 108. The reduction of the distance between fulcrum axis 82 and jacking device swivel axis 108 causes the inner and outer lifting structures 8, 10 to be drawn into a deployed scissor configuration as shown in FIGS. 3A–B, as compared to the non-deployed parallel configuration.

It is further noted that first cross member 24 of inner lifting structure 8 is designed such that it remains stationary during deployment. On the other hand, second cross member 52 is designed to roll via roller wheels 56 as lift 2 is being deployed. Additionally, as lift 2 is being deployed, the upwardly positioned rearward end of inner lifting structure 8 is allowed to slide along the slot provided in the slotted connecting brace 80, via roller 92, to compensate for the contraction of the distance between rearward axle 91 and forward axle 90.

Once motorcycle lift 2 is fully deployed, bracing member 12 should be positioned over and engaged with lower cross beam 52 such that a rigid structural member (i.e. bracing member 12) now bears the weight of motorcycle 4 and relieves the articulated lifting system 5 from bearing the weight of the motorcycle.

To lower the motorcycle lift 2 from a deployed position to a non-deployed position, the sequence of aforementioned events occurs in a reversed order. In particular, bracing member 12 is disengaged from second lower cross beam 52 to transfer the burden of the weight back to the articulated lifting system 5. The jacking device 14 is configured to relieve hydraulic or pneumatic pressure, and the pressure is released in a controlled manner such that upper cradle support 6 is slowly forced down by the weight of motorcycle 4 until inner and outer lifting structures 8, 10 fully retreat into the non-deployed parallel position. Then, motorcycle 4 may be removed from lift 2. And finally, lift 2 to may be folded and returned to storage if desired.

Second Exemplary Embodiment of the Portable Motorcycle Lift

Overview of the Second Exemplary Embodiment

FIGS. 9 through 18 illustrate a second exemplary embodiment of the portable motorcycle lift 3. Motorcycle lift 3 utilizes a scissor frame configuration similar to the first embodiment. The motorcycle lift 3 includes an upper cradle support 206, an outer lifting structure 208, and inner lifting structure 210 rotatably hinged about a common center fulcrum 211. Motorcycle lift 3 has a deployed configuration (see FIGS. 9, 11–12, 14–15) and a folded, stowable non-deployed configuration which allows the lift 3 to be transported similar to a dolly (similar to FIG. 8A–B; see also FIG. 17). To provide the required forces to lift a large motorcycle, an articulated lifting system 205 (see FIG. 12) is provided which includes a jacking device 214, lifting arm 216, and linkage arm 218 which are integrated within the outer and inner lifting structures 208, 210. Other features of motorcycle lift 3 include a bracing member 212, removable rear support 213, removable ramp 388, well chock 278, remote jacking system 342, a remote pressure release feature 354, and a slidable removable jacking device 392.

The aforementioned components and other features of the second embodiment of present invention will first be described in this section of the specification. After each component is individually described, the integration of the components will be explained. Finally, a description is provided which explains the functionality of the second embodiment of the present invention and how the lift 3 is operated.

Inner Lifting Structure of the Second Exemplary Embodiment

Inner lifting structure 210 comprises an inner left rail 240 and an inner right rail 242 (see FIG. 9, 13) which are laterally spaced apart from each other and positioned parallel to one another. Inner left rail 240 includes an inner lower left member 244 and an inner upper left member 246. Inner right rail 242 includes an inner lower right member 248 and an inner upper right member 250. For both inner rails 240, 242, upper members 246, 250 are positioned vertically above and parallel thereto lower members 244, 248. Both lower members 244, 248 and upper members 246, 250 are preferably, made from light weight high-strength metal tubing, for example a high-strength steel or aluminum alloy. In the second embodiment, the lower members 244, 248 and upper members 246, 250 preferably have a same diameter.

Inner upper left and right members 246, 250 are respectively connected to outer left and right lower members 244, 248 by a pair of vertical support struts 226. Additionally, inner upper left and right members 246, 250 are respectively connected to inner left and right lower members 244, 248 by plate bracing 330. Plate bracing 330 may have cutouts 332 for weight reduction purposes. The cutouts 332 may conform to the tradename of the manufacturer of the motorcycle lift 3.

Fulcrum assembly 211 is positioned about fulcrum axis 282 which transversely intersects inner lifting structure 210 at a middle region. A couple pair of rail braces 258, 260 (see FIG. 13) are interconnected between lower members 244, 248 and upper members 246, 250 proximate about half the length of inner lifting structure 210 and are utilized as part of the mounting structure for the fulcrum assembly 211. Apertures are provided in each of the pair of rail braces 258, 260 and a fulcrum axle housing 284 (see FIG. 13) is mounted within the apertures and aligned about fulcrum axis 282. Further details on the fulcrum assembly will be described later in the specification.

A lower cross beam 252 is transversely oriented and connected to the rearward distal ends of lower left and right members 244, 248 (see FIG. 9, 11). Preferably, lower cross beam 252 is made from tubing having a same diameter as the diameter of lower members 244, 248. A roller wheel assembly 256 is mounted to each distal end of cross beam 252 which allows cross beam 252 to roll as motorcycle lift 3 is being deployed upwards or being lowered to the floor surface. Preferably, the wheels of assembly 256 are constructed of a durable steel rated for industrial applications; however, the wheels may be composed of resilient matter such as urethane, rubber, plastic or other materials known in the art for manufacturing wheels.

Outer Lifting Structure of the Second Exemplary Embodiment

Outer lifting structure 208 comprises an outer left rail 230 and an outer right rail 232 which are laterally spaced from each other and positioned parallel to one another (see FIG. 9). Outer left rail 230 includes an outer lower left member 220 and outer upper left member 222. Outer right rail 232 includes an outer lower right member 221 and an outer upper right member 223. Upper members 222, 223 are vertically positioned directly above and parallel to respective lower members 220, 221. Lower members 220, 221 and upper members 222, 223 are preferably made from light weight high-strength metal tubing, for example a high-strength steel or aluminum alloy. In the second embodiment, the lower members 220, 221 and upper members 222, 223 preferably have a same diameter.

Upper left and right members 222, 223 are connected to respective lower left and right members 220, 221 by a pair of vertical support struts 226. Upper left and right members 222, 223 are also connected to respective lower left and right members 220, 221 by plate bracing 330. Moreover, plate bracing 330 may have cutouts 332 for weight reduction purposes. The cutouts may conform to the tradename of the manufacturer of the motorcycle lift. A couple of pair of rail braces 236 connected between lower members 220, 221 and upper members 222, 223 (see FIGS. 9, 11; left side not shown) are positioned about in the middle of outer lifting structure 208 and are utilized as part of the mounting structure for fulcrum assembly 211. Braces 234, 236 are preferably made from plate stock.

A first lower cross beam 224 is transversely oriented and connected to the forward distal ends of lower members 220, 221. Preferably lower cross beam 224 is made from tubing having a same diameter as the diameter of lower members 220, 221, 222, 223. A slidable transverse member 372 oriented about slidable axis 380 (see FIG. 10) is utilized to interconnect the rearmost portion of the upper left and right members 222 together 223. Further details on the aforementioned slidable connection are provided later in the specification.

Support Platform of the Second Exemplary Embodiment

Similar to the first embodiment, upper cradle support 206 is adapted to receive at least one of the front and rear wheel of motorcycle 4. When deployed, cradle support 206 is in a substantially horizontal position. As shown in FIG. 9, support platform 206 has a width W which is adapted to receive a motorcycle tire. It is noted that width W may vary with respect to differing embodiments of the present invention. Similarly, the length L (see FIG. 11) of upper cradle support 6 may vary with respect to varying wheel base lengths of motorcycles 4.

Similar to the first embodiment, upper cradle support 206 comprises a lower left support member 262, lower right support member 264, an upper left support member 266 and upper right support member 268, all of which are longitudinally oriented and positioned parallel with respect to each other. Also, similar to the first embodiment, lower support members 262, 264 are positioned laterally next to each other in a same horizontal plane, and upper members 266, 268 are positioned laterally next to each other and in another horizontal plane. However, upper members 266, 268 positioned above lower support members 262, 264 and spaced wider apart than lower support members 262, 264. As a result, a unshaped channel is provided which is adapted to receive at least one of the front and rear wheel of motorcycle 4 when the motorcycle 4 is positioned inside the cradle support 206. Lower support members 262, 264 and upper members 266, 268 are preferably, made from light weight high-strength metal tubing, for example a steel alloy or a high strength aluminum. The diameters of lower support members 262, 264 and upper members 266, 268 are preferably a smaller diameter as compared to the diameters of outer lifting structure 208 and inner lifting structure 210

Figure 11:
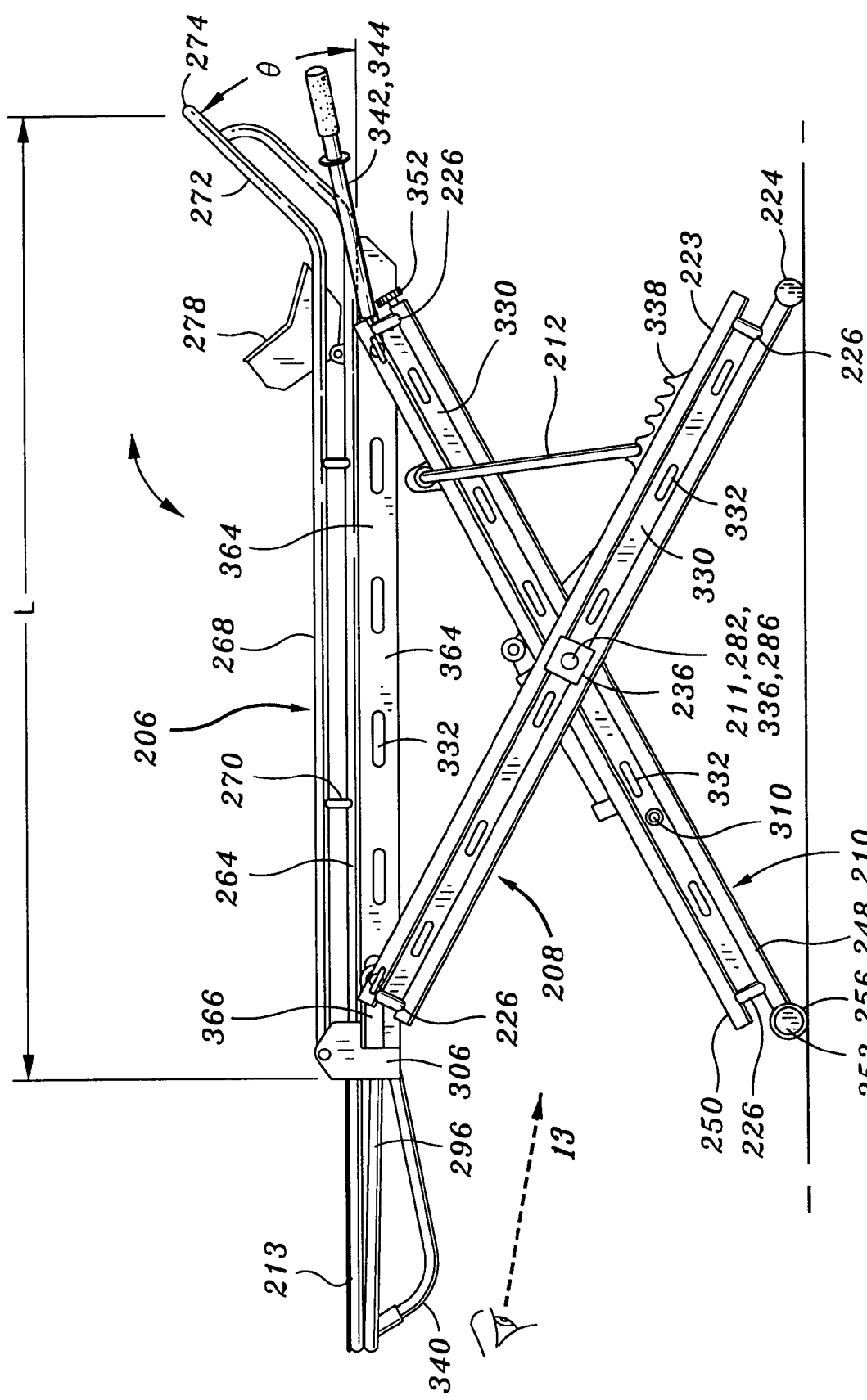
FIG. 11 is a side view of the second exemplary embodiment of the motorcycle lift in a deployed position.

Similar to the first embodiment, cradle support struts 270 are utilized to interconnect lower support members 262, 264 to upper members 266, 268. As a result, a u-shaped channel is provided which is adapted to receive both tires/wheels of motorcycle 4 when the motorcycle is positioned inside upper cradle support 206. Also, similar to the first embodiment, a forward tire cradle 272 is provided on the forward end of support platform 206. Tire cradle 272 is formed by bending lower support members 262, 264, and upper support members 266, 268 upwardly according an acute angle e (see FIG. 11). As best illustrated in FIGS. 9 and 11, upper support members 266, 268 are connected together forming cradle arch portion 274 and lower members 262, 264 are bent such that they are connected to upper support members 266, 268 at a position before the formation of arched portion 274.

The second embodiment features a pair of vertically-oriented planar rails 362, 364 mounted beneath lower support members 262, 264. The left planar rail 362 and the right planar rail 364 provide mounting structure and interfaces for both the outer lifting structure 208 and the inner lifting structure 210. Disposed on the most rearward end of each planar rail 362, 364 is an adjustment slot 366 for slidably receiving the most rearward end of outer lifting structure 208, the function of which will be detailed later in the specification. Disposed at the forward end of each planar rail 362, 364 is a forward bore 370 (see FIG. 9). Between each forward bore is a forward axle housing 288 for rotatably receiving transversely oriented axle 290 (see FIG. 13). Axle 290 may is interconnected between a forward fixed transverse member 374. Attached to the distal ends of transverse member 374 are eyelet extensions 386 and securing eyelets 384. Since the forward axle housing 288 is rigidly attached between each planar rail 362, 364, the axle housing 288 will rotate about axle 290 when the motorcycle lift 3 is being deployed or lowered. Further details on how the inner lifting structure is connected to and interfaces with the upper cradle support 206 will be discussed later in the specification.

A wheel chock 278 similar to the first embodiment is attached to upper cradle support 206 which is utilized to ensure that the tire loaded into the forward tire cradle 272 is properly supported. The features of wheel chock 278 which have already been discussed with respect to the first embodiment and are similar with respect to the second embodiment.

Integration of Support Platform, Inner Structure, and Outer Lifting Structure of the Second Exemplary Embodiment The following paragraphs describe will now how upper cradle support 206, outer lifting structure 208, and inner lifting structure 210 are interconnected to and integrated with each other. Outer lifting structure 208 and inner lifting structure 210 are connected at center fulcrum 211 which defines a fulcrum axis 282. Inner lifting structure 210 is designed such that it fits within outer lifting structure 208 so that outer lifting structure 208 and inner lifting structure 210 may be rotated with respect to each other about center fulcrum 211.

Proximate about half the length of inner lifting structure 210 is the fulcrum assembly 211. Apertures (not shown) are provided in each of the pair rail braces 258, 260 (see FIG. 13). And a fulcrum axle housing 284 (see FIG. 13) is mounted within the apertures inside inner lifting structure 210 transversely between the outermost brace of each couple pair of rail braces 258, 260 (see FIG. 13). Thus, axle housing 284 is also positioned about fulcrum axis 282. The couple of pair of rail braces 234 (not shown), 236 are also provided with apertures 336 positioned about fulcrum axis 282. Apertures 334 and axle housing 284 are adapted to receive a fulcrum axle 286 (see FIG. 13) which rotatably fits within axle housing 284. The result is center fulcrum assembly 211 which comprises at least fulcrum axle 286 and axle housing 284 which secure inner lifting structure 210 and outer structure 208 together such that axle housing 284 may rotate about axle 286, both of which are centered about fulcrum axis 282.

The forward end of inner lifting structure 210 is rotatably attached to the forward end of support platform 206 about forward fixed axis 376 using forward fixed transverse member 374 and axle 290, forward axle housing 288, spacer 378, and jacking arm axle housing 346 (see FIG. 13) which combines to interconnect inner upper left and right members 246, 250. As noted previously, forward axle housing 288 (see FIG. 13) rigidly attached to the inboard surfaces of the left planar rail 362 and the right planar rail 364. The result is a joint or hinge which rotates about forward fixed axis 376 comprising at least an axle 290 and housing 288 which secures the forward end of inner lifting structure 210 and to the forward end support platform 206 together, such that axle housing 288 may rotate about axle 290 and forward fixed transverse member 374.

The rearward end of outer lifting structure 208 is rotatably and slidably attached to the rearward end of support platform 206 (see FIG. 10*j* utilizing slidable transverse member 372 which is oriented about slidable axis 380. Disposed on the rearward end of each planar rail 362, 364 is an adjustment slot 366 for slidably receiving the rearward end of outer lifting structure 208. The slidable transverse member 372 interconnects the upper left and right members 222 together 223. Attached to each distal end of slidable transverse member 272 are securing eyelets 384. Roller 292 is positioned within and between both of the adjustment slots 366 and rolls on planar surface 383. Furthermore, roller 292 is adapted to rotate about the slidable transverse member 372. As a result, roller 292 is maintained within both adjustment slots 366 and rolls forward or backwards on planar surface 382, allowing the most rearward end of outer lifting structure 208 to movably slide within adjustment slots 366.

Lifting System of the Second Exemplary Embodiment

Figure 12:
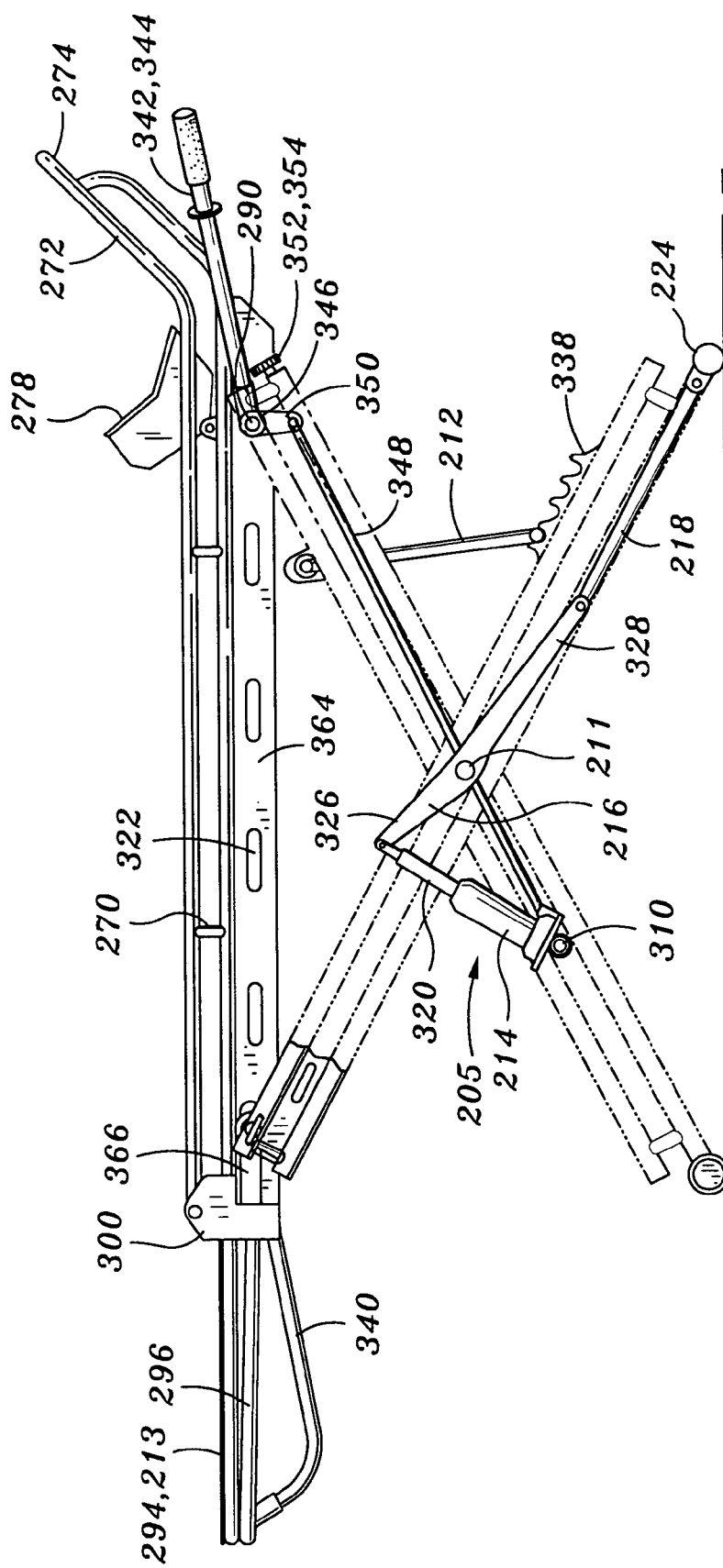
FIG. 12 is the same side view as shown in FIG. 11, which further shows details of the articulated lifting system.
Figure 13:
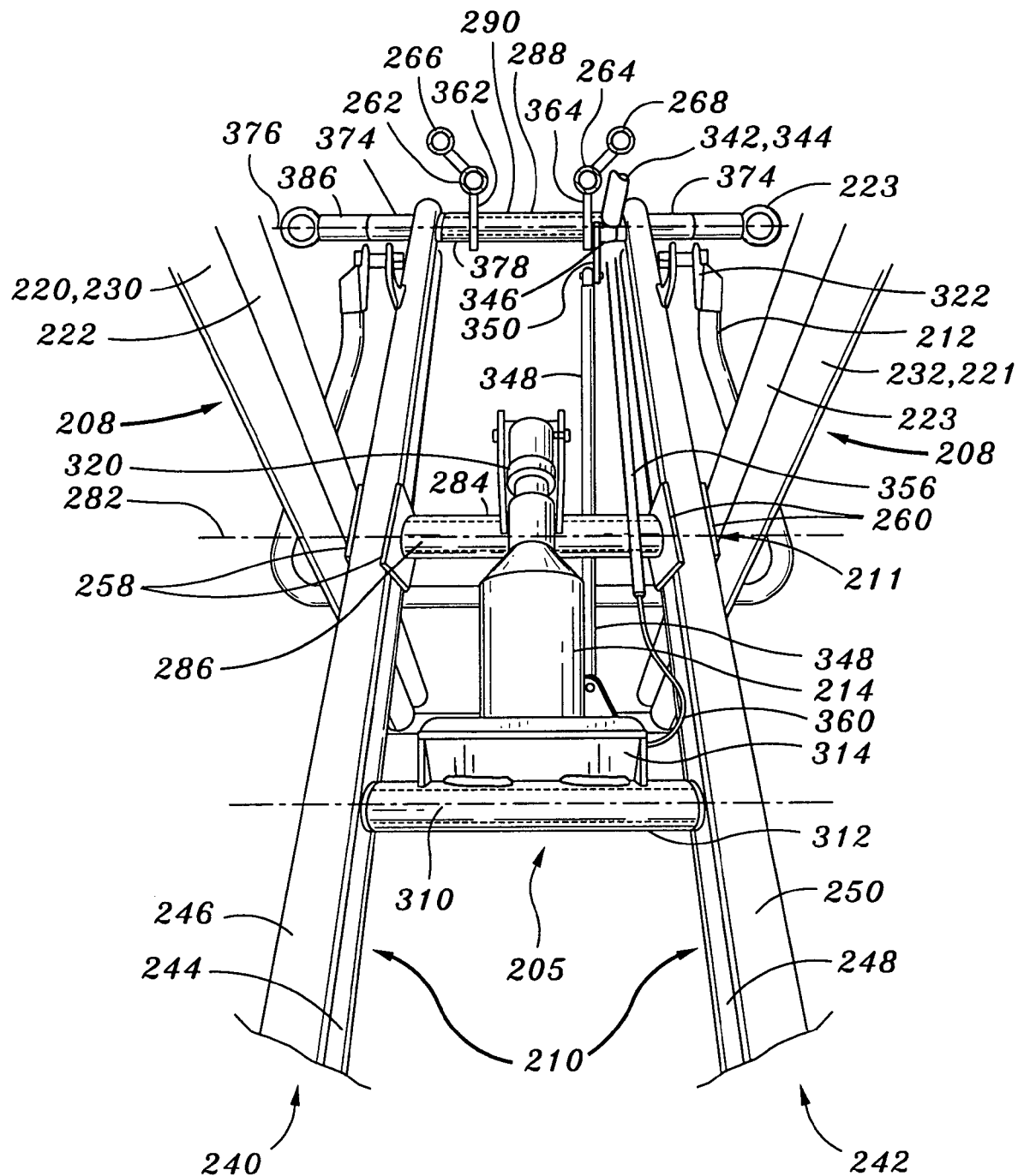
FIG. 13 is a partial perspective view of the jacking device and fulcrum assembly of the second exemplary embodiment, according to an aspect of the present invention.

The articulated lifting system 205 may be similar to that of the first embodiment's lifting system. An exemplary lifting system 205 for the second embodiment is best illustrated in FIGS. 12 and 13. Lifting system 205 comprises at least a jacking device 214, a lifting arm 216, and a rearward linkage arm 218. Similar to the first embodiment, lifting system 205 is positioned partially within the forward portion of the outer lifting structure 208 and partially within the rearward portion of inner lifting structure 210. Lifting arm 216 is rigidly connected (e.g. welded) to fulcrum axle housing 284. Thus, lifting arm 216 and fulcrum axle housing 284 act as a unitary member which rotates or revolves around fulcrum axle 286 which is centered along and about fulcrum axis 282.

The jacking device 214 of the instant embodiment may be a hydraulic bottle jack similar to that of which is utilized in the first embodiment. The lifting system 205 is designed to be self-contained for portability, since the jacking device 214 is not dependent on compressed air. Similar to the first embodiment, jacking device 214 is mounted to a backing plate 314 (see FIG. 13). And a jacking device axle 310 is received within apertures provided in the plate bracing 330. Backing plate 214 is attached to a jacking device axle housing 312 (see FIG. 13) which is adapted to rotate or revolve about jacking device axle 310. As a result, whenever jacking device 314 is being utilized, axle 310 provides a structural cross member that allows jacking device 214 to partially rotate about the joint, while axle 310 provides a reactive force to jacking device 214.

As shown in FIGS. 12 and 13, the distal end of jacking device displacement arm 320 is swivel attached to a forward portion 326 of lifting arm 216. As previously mentioned, lifting arm 216 is rigidly connected (e.g. welded) to fulcrum axle housing 284, and therefore, lifting arm 216 and fulcrum axle housing 284 act as a unitary member which rotates or revolves around fulcrum axle 286 which is centered along and about fulcrum axis 282. The rearward portion 328 of lifting arm 216 is attached to a rearward linkage arm 218. The other end of rearward linkage arm 218 is swivel attached to second lower cross beam 224.

Additionally, the second embodiment incorporates a remote jacking system 342, which comprises jacking arm 344, jacking arm axle housing 346, jacking leverage arm 350 and jacking linkage arm 348. The remote jacking system 342 which is utilized to hydraulically jack up the jacking device 214 is best illustrated in FIGS. 11 through 13. The jacking system 342 is provided as an added safety feature, and is configured such that the jacking device 214 may be jacked up without the operator having to reach inside the scissor-lift structure. This feature may also be utilized on the first exemplary embodiment.

In particular, jacking leverage arm 350 and jacking arm 344 are both rigidly attached to the jacking arm housing 346 (e.g., by welding) such that the both the jacking leverage arm 350 and jacking arm housing 346 act as one unitary part. With regard to the radial positioning about the jacking arm housing 346, the jacking leverage arm 350 has a downwardly orientation, while the jacking arm 344 has a slightly upward orientation (with respect to a horizontal reference). The jacking arm housing 346 is rotatably fit about forward axle 290 between the inner upper right member 250 of the inner right rail 242 of inner lifting structure 210, and the forward end of support platform 206 which is connected to the forward axle housing 288 (see FIG. 13). The result is a joint or hinge which comprises at least axle 290 and housing 346 which allows the jacking leverage arm 350 to rotate about axle 290. The distal end of the jacking leverage arm 350 is connected to a forward positioned end of the jacking linkage arm 348, while the other end of the jacking linkage arm 348 is rigidly connected to the jacking input on the jacking device 214.

Another feature incorporated into the second embodiment is a remote pressure release feature 354 (see FIG. 9, 12, 13) which is utilized to release pressure (e.g., hydraulic or pneumatic depending on the type of jacking device utilized) to lower the motorcycle lift 3. This feature may also be utilized on the first exemplary embodiment. The remote pressure release may comprise of at least a thumb wheel knob 352, a longitudinal housing 356, an inner rotatable rod (not shown), and a cable 360 having a flexible inner turning element (not shown). The built up pressure in a jacking device 214 is relieved by releasing the pressure through a bleed valve. The bleed valve in the instant exemplary jacking device 214 may be a threaded plug which when rotated a specific direction (e.g., clockwise or counterclockwise depending on the device), will release pressure contained in the chamber of the jacking device 214. For safety precautions, in particular, such that the operator of the motorcycle lift does not have to reach into the scissor structure, the remote pressure release feature 354 connects one end of the cable 360 having the flexible inner turning element to the threaded plug. The inner turning element is adapted to be able to turn the threaded plug either (e.g., clockwise or counterclockwise depending on the device. The other end of the cable 360 and turning element are connected to longitudinal housing 356 which, for the instant embodiment, is attached and oriented along the inner right rail 242 of inner lifting structure 210. The other end of the housing 356 terminates at the most forward end of inner right rail 242 (see FIG. 13). The inner rotatable rod (not shown) is housed within housing 356. One end of turning rod 358 is attached to and adapted to rotate the turning element in the cable 360. The thumb wheel knob 352 is mounted to the other end of housing 356 near the most forward end of inner right rail 242. Therefore, when the operator wishes to release pressure from the jacking device 214, the thumb wheel knob 352 is rotated. When the thumb wheel knob 353 is rotated, the inner turning rod 358 rotates, which in turn rotates the flexible inner turning element of cable 360, which in turn rotates the threaded to plug to either close or open the bleed valve of the jacking device 214.

Additionally, another embodiment of the remote pressure release feature 354 may include an articulated arm (not shown), which is swivel attached to the bleed valve of the jacking device 214. The articulated arm may have at least one swivel elbow and a long extension arm with a thumb wheel knob attached to the distal end.

It is further noted and recognized that both the first and second embodiment may utilize a variety of other jacking devices and/or jack configurations, and therefore, should not be limited to the specific jacking device utilized in the instant exemplary embodiment Bracing Member of the Second Exemplary Embodiment A bracing member 212 which has a bowed out u-shape is utilized as an added safety measure to provide a rigid structural member between inner lifting structure 210 and outer lifting structure 208. The use of bracing member 212 relieves articulated lifting system 205 from bearing the load of the motorcycle 4 once bracing member 212 is positioned between inner lifting structure 210 and outer lifting structure 208. Each upwardly projecting arm of the u-shaped brace 212 is also attached to a bracing member bracket 322 which is attached to a forward portion of inner upper left member 246 and an inner upper right member 250. The pair of bracing member brackets 322 provides a hinge of which brace 212 is rotatably attached. Thus, the hinge on both brackets are aligned about a common axis of which u-shaped brace 212 also rotates about. A bracket having a series of semicircular catches 338 is mounted to the topside and forward portion of outer upper left member 222 and outer upper right member 223. The semicircular catches 338 are adapted to be received by the lower end of brace 212. Thus, the lower end of brace 212 has a plurality of attach points for adjustability of which the lower end of the brace 212 may be attached.

Removable Support Section of the Second Exemplary Embodiment

Figure 14:
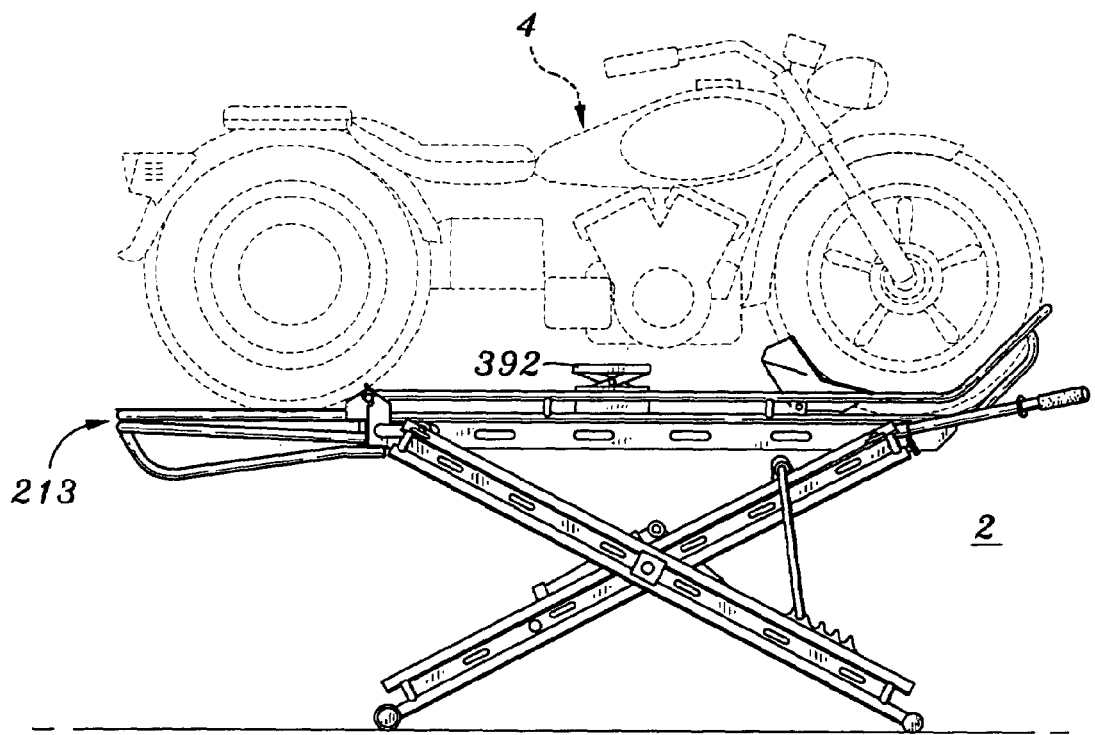
FIG. 14 is a side view of the second exemplary embodiment of the motorcycle lift with a removable and positionable auxiliary jacking device, according to an aspect of the present invention.
Figure 15:
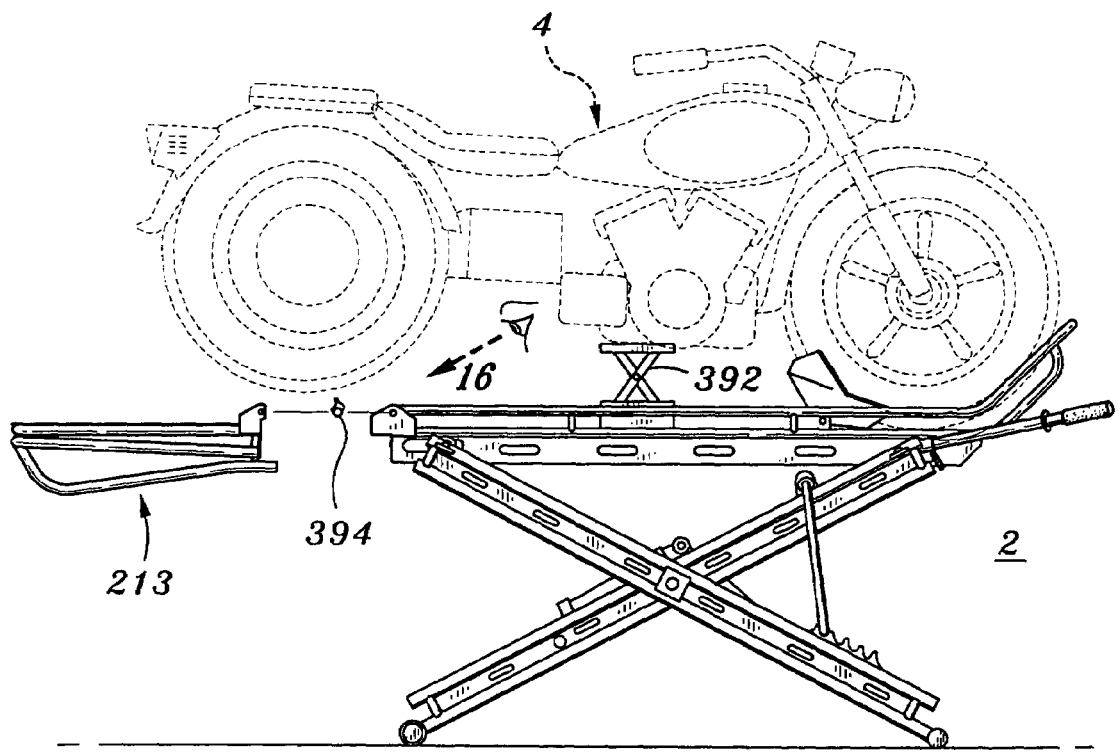
FIG. 15 is a side view of the second exemplary embodiment of the motorcycle lift with the removable and positionable auxiliary jacking device positioned under the motorcycle frame and in a lifted position, and furthermore, the rear support section of the lift has been removed.
Figure 16:
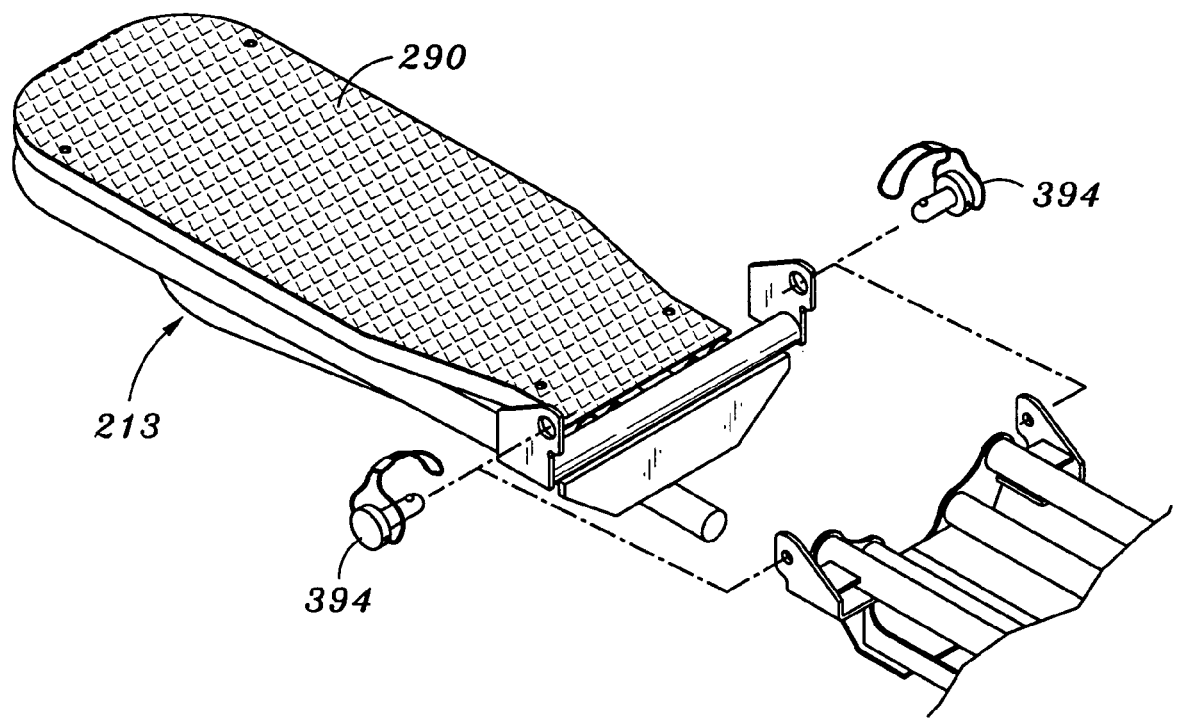
FIG. 16 is a detailed perspective of the removable rear section removed from the second exemplary embodiment motorcycle lift.

FIGS. 14 through 16 illustrate a removable rear support section 213 similar to that of the first embodiment. An additional feature that removable rear support section 213 may include is lower vertically oriented support 340 which is a tubular member having a substantial bend forming an elbow with two upwardly projecting portions (which resembles a saw handle). One of the upwardly projecting portions of the lower vertically oriented support 340 is attached to the bottom center of the entering end portion of rear support section 213, while the opposing end of lower support 340 is attached to angled bracket 306. The lower support 340 is included in the second embodiment to provide a support that is capable of contacting the floor surface when the motorcycle 4 is being loaded on the lift 3. Another additional feature is an upper support plate 390 which is attached the topside of the removable rear support section 213 which provides a flat surface for the motorcycle wheels as they are rolled over the rear support section 213. It is noted that both the lower vertically oriented support 340 and the upper support plate 390 may also be incorporated into the rear support section 13 of the first embodiment.

As noted and illustrated in FIGS. 15 and 16, rear support section 213 is that it is designed and configured to be removable. This feature is provided to allow the operator of the motorcycle lift 3 better access to the rearend of the motorcycle 4. For example, with respect to maintenance or repair, many times the rear tire and wheel assembly of the motorcycle have to be removed. To accomplish this task, rear support section 213 may be removed by removing removable pins 394.

Removable and Positionable Auxiliary Jacking Device

As shown in FIGS. 14 and 15, incorporated in the second exemplary embodiment is a removable and positionable jacking device 392 may be slidably positioned within the upper cradle support 206 such that it can be placed underneath the motorcycle frame. In particular, the removable jacking device 392 is adapted to be placed atop lower left and right support members 262, 264 and between upper left and right support member 266, 268. Preferably the jacking device 392 is a compact scissor-type jacking system which may be operated by a handlever, however, other types of compact jacking devices may be utilized. The jacking device may then be slid along the horizontal portion of the upper cradle support and positioned underneath the frame of the motorcycle. The jacking device 392 may then operated to lift the motorcycle 4. Operation of the jacking device is discussed in more detail in the following section. It is also noted that the removable jacking device 392 may be incorporated into the first embodiment as well.

Operation of the Second Exemplary Embodiment

The functionality and operational aspects of the second exemplary embodiment of the portable motorcycle lift 3 are now described below. The second embodiment operates on the same basic principles as that are taught in the first embodiment. Additionally, as already described, the second embodiment incorporates the remote jacking system 342 and the remotes pressure release feature 354.

As shown in FIG. 17, loading ramp 388 may be attached to the rearward portion of the rear support section 213 using ramp hook 396. Once motorcycle 4 is loaded and secured within cradle support 6, the remote pressure release feature is closed by turning the thumb wheel knob 352. Next, the operator may initiate upward deployment of upper cradle support 206 to a fully elevated position by operating jacking arm 344. In the instant exemplary embodiment, the hydraulic bottle jack is pumped by moving jacking arm 344 in an upward and down swinging motion about the forward rotatably fixed transverse member 374 oriented about the forward fixed axis 376. When motorcycle lift 3 is fully deployed, bracing member 12 should be positioned over and engaged with lower cross beam 52 such that a rigid structural member (i.e. bracing member 12) now bears the weight of motorcycle 4 and relieves the articulated lifting system 5 from bearing the weight of the motorcycle.

To lower the motorcycle lift 3 from a deployed position to a non-deployed position, the sequence of aforementioned events occurs in a reversed order. In particular, bracing member 212 is disengaged from brackets having semicircular catches 333 to transfer the burden of the weight back to the articulated lifting system 205. The operator then slowly opens the thumb wheel knob 352 of the remote pressure release feature 354 to gradually release the hydraulic or pneumatic pressure. The pressure is released in a controlled manner such that upper cradle support 206 is slowly forced down by the weight of motorcycle 4 until inner and outer lifting structures 210, 208 fully retreat into the non-deployed parallel position.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the invention in its aspects. Although the invention has been described with reference to particular means, materials and embodiments, the invention is not intended to be limited to the particulars disclosed; rather, the invention extends to all functionally equivalent structures, methods, and uses such are within the scope of the appended claims.

What is claimed is:

1. A portable motorcycle lifting device for supporting a motorcycle having front and rear tires, the device comprising:
   an inner lifting structure having a first forward and first rearward end;
   an outer lifting structure having a second forward and second rearward end;
   an upper wheel cradle support having a third forward and third rearward end, the wheel cradle support being sized and configured to receive tires of the motorcycle, the wheel cradle support including a wheel chock; and
   an articulated lifting system integrated within said inner and outer lifting structures, wherein said inner lifting structure is generally positioned within said outer lifting structure and both lifting structures are connected by a common fulcrum positioned approximately in the middle of each lifting structure,
   wherein said second rearward end of said outer lifting structure is rotatably and slidably attached to said third rearward end of said upper support cradle,
   wherein said first forward end of said inner lifting structure is rotatably attached to said third forward end of said upper cradle support,
   wherein said articulated lifting system may be operated to raise said upper cradle support from a non-deployed position to a fully deployed position.

2. The lifting device according to claim 1, said first rearward end of said inner lifting structure having a first transversely mounted cross member, and said second forward end of said outer lifting structure having a second transversely mounted cross member.

3. The lifting device according to claim 2, said first cross member having a roller wheel assembly mounted to each end of said first cross member.

4. The lifting device according to claim 3, wherein when said lifting device is deployed or reconfigured to the non-deployed position, said first cross member rolls on the floor surface via said roller wheel assemblies and said second cross member stays in a stationary position.

5. The lifting device according to claim 4, wherein when said lifting device may be moved similar to that of a dolly.

6. The lifting device according to claim 4, wherein said lifting device may be stored in a vertically upright position similar to that of a dolly.

7. The lifting device according to claim 1, said wheel chock adapted to accept an incoming wheel without requiring any adjustment by the operator of said lifting device.

8. The lifting device according to claim 1, said third forward end of said upper cradle having an upwardly inclined portion which forms a forward tire cradle.

9. A portable motorcycle lifting device comprising:
   an inner lifting structure having a first forward and first rearward end;
   an outer lifting structure having a second forward and second rearward end;
   an upper cradle support having a third forward and third rearward end;
   an articulated lifting system integrated within said inner and outer lifting structures, wherein said inner lifting structure is generally positioned within said outer lifting structure and both lifting structures are connected by a common fulcrum positioned approximately in the middle of each lifting structure, the articulated lifting system comprising,
   a hydraulic bottle jack having a base pivotally mounted about a jacking device axle mounted transversely in a rearward region of said inner lifting structure, and a displacement arm which is adapted to be hydraulically pushed from said bottle jack, said displacement arm having a distal end;
   a lifting arm rotatably attached about said fulcrum, said lifting arm having a forward portion and a rearward portion, said rearward portion pivotally attached to said distal end of said displacement arm; and
   a forward linkage arm having one end pivotally attached to said forward portion of said lifting arm, and another end pivotally attached to said second_forward end of said outer lifting structure;
   wherein said second rearward end of said inner lifting structure is rotatably and slidably attached to said third rearward end of said upper support cradle, wherein said first forward end of said outer lifting structure is rotatably attached to said third forward end of said upper cradle support, wherein said articulated lifting system may be operated to raise said upper cradle support from a non-deployed position to a fully deployed position.

10. The lifting device according to claim 9, wherein said bottle jack is operated by a remote jacking system comprising a jacking arm attached to a jacking arm axle housing, a jacking leverage arm connected to said axle housing, and a jacking linkage arm having one arm articulately linked to the leverage arm and another end articulately linked to a jacking input of said hydraulic bottle jack.

11. The lifting device according to claim 9, further comprising a remote pressure release feature including a cable having a flexible inner turning element with one end connected to a bleed valve on said hydraulic bottle jack, and another end attached to a first end of an inner rotatable rod rotatably housed in a longitudinal housing, and a thumb wheel knob attached to a second end of the inner rotatable rod.

12. The lifting device according to claim 11, said remote pressure release feature comprising an articulated arm comprising at least two segments having a swivel joint therebetween each of said at least two segments, said articulated arm having a first end swivel attached to a bleed valve on said hydraulic bottle jack, and a thumb wheel knob attached to a second end of said articulated arm.

13. The lifting device according to claim 1, wherein when said motorcycle lifting device is in the non-deployed position, said articulated lifting system is positioned in a generally straight configuration within said inner and outer lifting structure.

14. The lifting device according to claim 1, further comprising a removable rear support section rotatably attached to said rearward end of said upper cradle support, said rear support section having a vertically oriented lower ramp support formed from a tubular member having a substantial bend forming an elbow which is adapted to contact the ground for support when a motorcycle is being loaded onto said lifting device.

15. The lifting device according to claim 14, further comprising an upper support plate positioned atop and fixedly attached to said removable rear support section.

16. The lifting device according to claim 14, wherein said rear support section may be folded upwards and positioned next to said upper cradle support when said lifting device stored in a vertical position.

17. The lifting device according to claim 1, further comprising a bracing member which is hingedly attached to an upper forward end of said inner lifting member and which may be engaged with one of a series of catches positioned on an upper forward portion of said outer lifting structure.

18. The lifting device according to claim 14, further comprising a removable ramp adapted to be attached to a rearward portion of the rear support section and further adapted to contact the ground.

19. The lifting device according to claim 18, said removable ramp comprising a tubular frame structure having a generally rectangular and planar shape, and a ramp hook attached to an end of said ramp for attachment to said rear support section.

20. The lifting device according to claim 1, further comprising a removable and positionable auxiliary jacking device adapted to fit within said upper cradle support.

21. A portable motorcycle lifting device comprising:
a first lifting structure having a first forward and first rearward end;
a second lifting structure having a second forward and second rearward end, the second lifting structure connected to the first lifting structure by a common fulcrum positioned approximately in the middle of each lifting structure;
an upper cradle support having a third forward and third rearward end, the second rearward end being rotatably and slidably attached to the third rearward end, and the first forward end being rotatably attached to the third forward end; and
an articulated lifting system integrated with said first and second lifting structures, the articulated lifting system comprising:
a jack connected to the first rearward end of the first lifting structure; a lifting arm rotatably attached about the fulcrum, the lifting arm having a forward portion and a rearward portion, the rearward portion of the lifting arm rotatably connected to the jack; and
a forward linkage arm having one end pivotally attached to forward portion of the lifting arm and another end pivotally attached to the second forward end of the second lifting structure;
wherein extension of the jack draws the second rearward end closer to the first forward end to raise the upper cradle support from a non-deployed position to a fully deployed position.

* * * * *